(12) United States Patent
Nakamura et al.

(10) Patent No.: US 8,446,981 B2
(45) Date of Patent: May 21, 2013

(54) TRANSMISSION APPARATUS, RECEPTION APPARATUS AND COMMUNICATION SYSTEM

(75) Inventors: Osamu Nakamura, Osaka (JP); Yasuhiro Hamaguchi, Osaka (JP); Kazunari Yokomakura, Osaka (JP); Jungo Goto, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 51 days.

(21) Appl. No.: 13/124,962

(22) PCT Filed: Oct. 20, 2009

(86) PCT No.: PCT/JP2009/068071
§ 371 (c)(1),
(2), (4) Date: Jun. 13, 2011

(87) PCT Pub. No.: WO2010/050383
PCT Pub. Date: May 6, 2010

(65) Prior Publication Data
US 2011/0228815 A1 Sep. 22, 2011

(30) Foreign Application Priority Data
Oct. 31, 2008 (JP) .................................. 2008-282260

(51) Int. Cl.
*H04L 27/00* (2006.01)
(52) U.S. Cl.
USPC ........................................................ 375/299
(58) Field of Classification Search
USPC ................. 375/295, 299, 259, 267, 285, 316, 375/340, 346, 347; 714/699, 746, 786; 370/310, 370/342, 343, 344
See application file for complete search history.

(56) References Cited

U.S. PATENT DOCUMENTS

| | | | | |
|---|---|---|---|---|
| 4,965,576 A | * | 10/1990 | Watanabe et al. | 341/94 |
| 8,077,793 B2 | * | 12/2011 | Khan et al. | 375/267 |
| 2007/0286302 A1 | * | 12/2007 | Hwang et al. | 375/267 |
| 2008/0049709 A1 | * | 2/2008 | Pan et al. | 370/344 |
| 2010/0067512 A1 | * | 3/2010 | Nam et al. | 370/342 |

FOREIGN PATENT DOCUMENTS

| | | |
|---|---|---|
| JP | 2005-12531 A | 1/2005 |
| WO | WO 2008/088054 A1 | 7/2008 |
| WO | WO 2008/129811 A1 | 10/2008 |

OTHER PUBLICATIONS

Alcatel Shanghai Bell et al., "UL multiple access with transmit diversity for 4-TX antennas", 3GPP TSG RAN WG1 Meeting #55, Nov. 10, 2008, R1-084128, Prague, Czech Republic.

(Continued)

*Primary Examiner* — Chieh M Fan
*Assistant Examiner* — Vineeta Panwalkar
(74) *Attorney, Agent, or Firm* — Birch, Stewart, Kolasch & Birch, LLP

(57) ABSTRACT

In SU-MIMO, even when the channel state of one antenna is poor, an error ratio is improved by obtaining a transmission antenna diversity effect. A transmission apparatus 100 that has a plurality of antennas 108-1 to 108-$N_{tx}$ and transmits a signal according to a MIMO (Multiple Input Multiple Output) system includes a DFT part 111 for precoding transmission data and a spectrum division part 112 for dividing a spectrum output from the DFT part 111. The divided spectrums are transmitted from the different antennas 108-1 to 108-$N_{tx}$, respectively.

6 Claims, 22 Drawing Sheets

OTHER PUBLICATIONS

LG Electronics, "Uplink multiple access schemes for LTE-A", 3GPP TSG RAN WG1 #54bis, Sep. 29, 2008, R1-083658, Prague, Czech Republic.

Motorola, "Uplink Access for LTE-A—Non-aggreegated and Aggregated Scenarios", 3GPP TSG RAN1 #54bis, Sep. 29, 2008, R1-083820, Prague, Czech Republic.

Panasonic, "Consideration on Multicarrier Transmission scheme for LTE-Adv uplink", 3GPP TSG RAN WG1 Meeting #53bis, Jun. 30, 2008, R1-082398, Warsaw, Poland.

T. Fujimori et al., "Channel Estimation Using Cyclic Delay Pilot for MIMO Transmission," Proc. The 4th IEEE VTS Asia Pacific Wireless Communications Symposium, National Chiao Tung University, Hsinchu, Taiwan, Aug. 20-21, 2007.

* cited by examiner

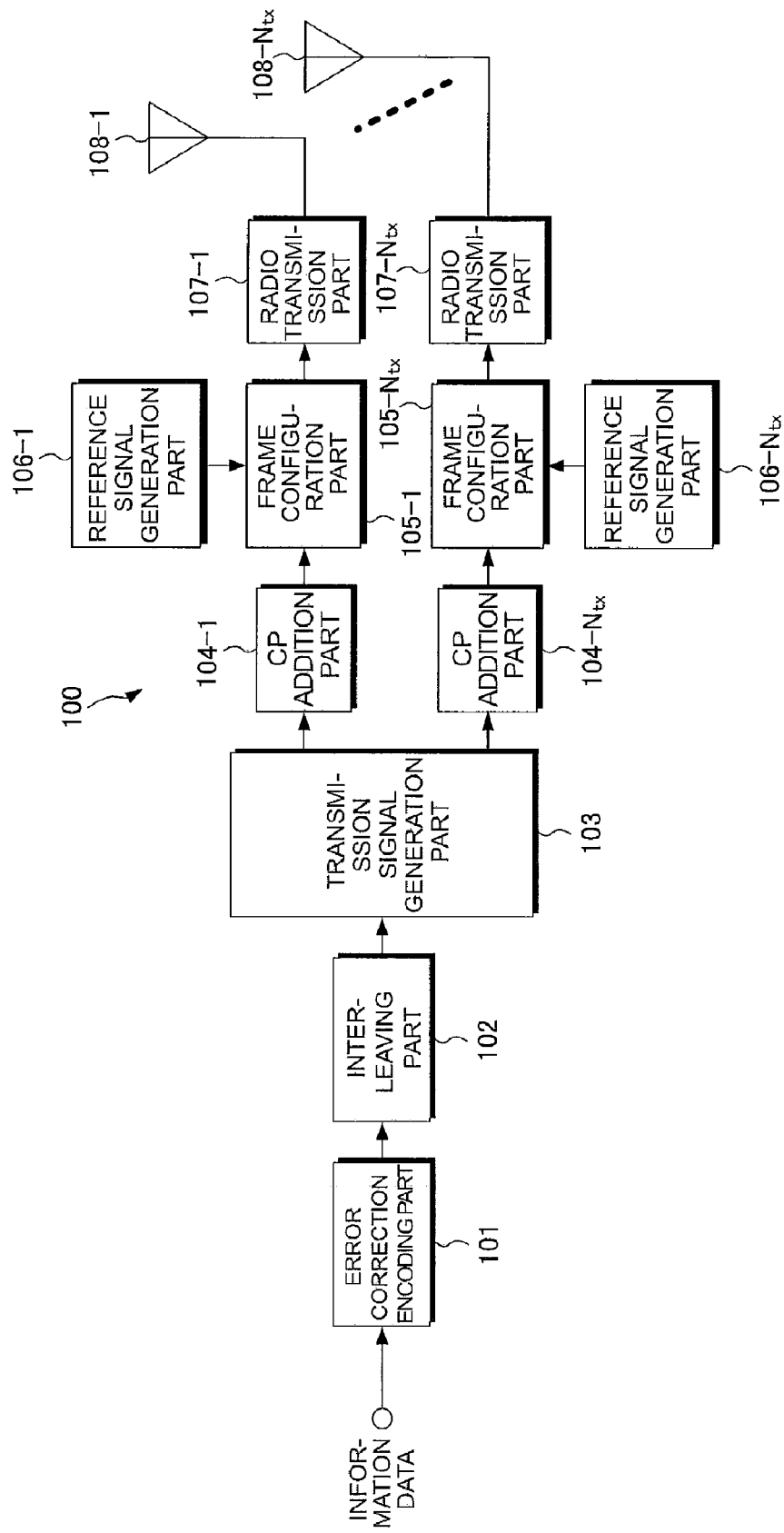

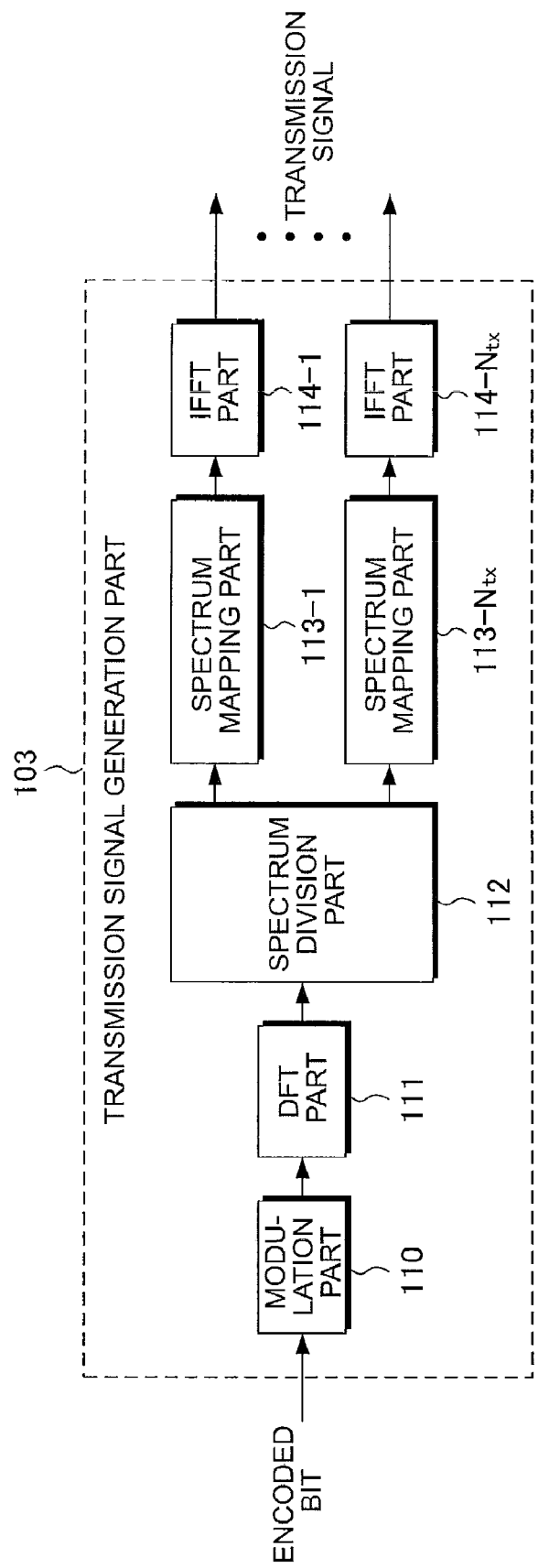

TRANSMISSION APPARATUS, RECEPTION APPARATUS AND COMMUNICATION SYSTEM

TECHNICAL FIELD

The present invention relates to a technology of transmitting/receiving a signal by use of a plurality of antennas according to a MIMO (Multiple Input Multiple Output) system.

BACKGROUND ART

In mobile communication, high-speed data transmission has been demanded heretofore. In a 3GPP (3rd Generation Partnership Project), LTE (Long Term Evolution) has been increasingly standardized as a standard that enables high-speed transmission and its specifications are being completed. In an uplink in LTE, DFT-S-OFDM ("Discrete Fourier Transform Spread Orthogonal Frequency Division Multiplexing", which is also referred to as "SC-FDMA") is adopted. Because DFT-S-OFDM can multiplex a frequency spectrum of each user in a frequency domain without using a guard band, the spectral efficiency is considered to be high.

More recently, LTE-Advanced (LTE-A) as an enhancement of LTE has been standardized as a 4th generation mobile communication system. LTE-A needs to support a higher spectral efficiency and a wider frequency band than that of LTE while maintaining backward compatibility with LTE. Hence, in order to achieve the higher spectral efficiency, with respect to DFT-S-OFDM, Clustered DFT-S-OFDM that divides a spectrum into a plurality of clusters and allocates the spectrums to frequency in unit of cluster is proposed.

Further, although in LTE, each terminal cannot perform simultaneous transmission from two antennas due to factors such as terminal costs, in LTE-A as an enhancement of LTE, transmission using a plurality of transmission antennas is discussed to achieve high-speed large-capacity communication. Particularly, SU-MIMO (Single User Multiple Input Multiple Output) that can improve a user throughput is one of the most promising technologies to be adopted.

FIG. 20 is a diagram showing configuration of a transmitter described in a non-patent literature 1. The non-patent literature 1 discloses an example of MIMO in previously-existing single carrier transmission. In FIG. 20, transmission data is divided for each antenna by a S/P conversion part 310. Here, it is assumed that the number of antennas is N. After that, modulation parts 311-1 to 311-$N_t$ modulate the data into modulation symbols by QPSK (Quaternary Phase Shift Keying) or 16 QAM (Quadrature Amplitude Modulation) or the like. At this time, data is multiplexed with a pilot block (which is also referred to as pilot symbol or reference signal) through a copy part 313 and a circulation delay part 314. After that, GI is inserted by +GI (Guard Interval, CP: Cyclic Prefix having the same meaning as GI is also used) parts 312-1 to 312-$N_t$ and signals are transmitted from antennas 315-1 to 315-$N_t$.

FIG. 21 is a diagram showing configuration of a receiver disclosed in the non-patent literature 1. Signals transmitted from the transmitter are received by antennas 410-1 to 410-$N_r$ of the receiver. In the receiver, —GI parts 411-1 to 411-$N_r$ provided at the antennas 410-1 to 410-$N_r$ remove guard interval and FFT parts 412-1 to 412-$N_r$ perform FFT (Fast Fourier Transform) for each antenna. When the frequency domain signal after FFT is the pilot symbol, a channel estimation part 413 performs channel estimation, and when the frequency domain signal after FFT is the data signal, a separation part 414 performs MIMO separation processing. Separated signals are returned to time domain signals by IFFT (Inverse FFT) parts 415-1 to 415-$N_t$ and then, demodulated by demodulation parts 416-1 to 416-$N_t$ based on the modulation in the transmitter, and finally, the signal for each antenna is P/S converted by a P/S conversion part 417 to extract data. With the above-mentioned configuration, in single carrier transmission, MIMO multiplexing can be realized.

[Non-patent literature 1] T. Fujimori, K. Takeda, K. Ozaki, A. Nakajima, and F. Adachi, "Channel Estimation Using Cyclic Delay Pilot for MIMO Transmission," Proc. The 4th IEEE VTS Asia Pacific Wireless Communications Symposium, National Chiao Tung University, Hsinchu, Taiwan, 20-21, Aug. 2007.

DISCLOSURE OF THE INVENTION

However, when SU-MIMO is performed in single carrier transmission, a signal independent from each antenna is modulated for each antenna and transmitted. Accordingly, as shown in FIG. 22, when a drop exists in the channel of the antenna 1, there is a possibility that $S_A$ cannot be correctly decoded. Although $S_A$ may be correctly decoded at error correction decoding due to the existence of $S_B$ received with high likelihood, when the coding rate is high, $S_A$ is decoded with error. As a result, the throughput is decreased.

The present invention has been made in view of such circumstances, and has an object to provide a transmission apparatus, a reception apparatus and a communication system which can improve the error rate by obtaining the transmission antenna diversity effect even when the channel state of one antenna is poor.

(1) To achieve the above-mentioned object, the present invention takes following measures. That is, a transmission apparatus of the present invention is a transmission apparatus that has a plurality of antennas and transmits a signal according to a MIMO (Multiple Input Multiple Output) system, the transmission apparatus comprising: a precoding part for precoding transmission data; and a spectrum division part for dividing a spectrum output from the precoding part, wherein the divided spectrums are transmitted from different antennas, respectively.

Since the spectrum output from the precoding part is divided and the divided spectrums are transmitted from different antennas respectively as described above, MIMO communication having a transmission antenna diversity gain becomes possible. This transmission antenna diversity effect enables good transmission, thereby increasing the user throughput.

(2) The transmission apparatus of the present invention includes a plurality of coding parts for performing error correction coding on transmission data; a plurality of modulation parts for modulating an output of the each coding part; a plurality of precoding parts for precoding an output signal of the each modulation part; and a plurality of spectrum division parts for dividing a spectrum output from the each precoding part.

With such configuration, the number of divided spectrums can be changed according to the number of code words. As a result, MIMO communication having the transmission antenna diversity gain becomes possible. This transmission antenna diversity effect enables good transmission, thereby increasing the user throughput.

(3) A transmission apparatus of the present invention is a transmission apparatus that includes a plurality of antennas and a plurality of transmission parts for transmitting a signal according to a MIMO (Multiple Input Multiple Output) system, wherein the each transmission part includes: an coding part for performing error correction coding on transmission data; a modulation part for modulating an output of the coding part; a precoding part for precoding an output signal of the modulation part; and a spectrum division part for dividing a spectrum output from the precoding part, and wherein serial/parallel converted transmission data is input to the each transmission part for each code word, and the each transmission part transmits the divided spectrums from the different antennas, respectively.

(4) In the transmission apparatus of the present invention, the precoding part performs DFT (Discrete Fourier Transform) to convert a time domain signal into a frequency domain signal.

As described above, by performing DFT (Discrete Fourier Transform) to convert the time domain signal into the frequency domain signal, it is possible to perform precoding and then, spectrum division.

(5) A reception apparatus of the present invention is a reception apparatus that has a plurality of antennas and receives a signal transmitted from a transmission apparatus according to claim 1 according to a MIMO (Multiple Input Multiple Output) system, the reception apparatus including: a MIMO separation part for separating spatially multiplexed spectrums; and a spectrum combining part for combining the separated spectrums.

As described above, by combining the divided spectrums, receive data can be obtained.

(6) In the reception apparatus of the present invention, the spectrum combining part combines partial spectrums for each code word.

With such configuration, the spectrums divided according to the number of code words can be combined.

(7) A communication system of the present invention includes the transmission apparatus according to claim 1 and the reception apparatus according to claim 5, or the transmission apparatus according to claim 2 and the reception apparatus according to claim 6.

With such configuration, MIMO communication having the transmission antenna diversity gain becomes possible. This transmission antenna diversity effect enables good transmission, thereby increasing a user throughput.

According to the present invention, by dividing the spectrum of the single carrier and transmitting multiplexed spectrums from the antennas, MIMO communication having the transmission antenna diversity gain becomes possible. This transmission antenna diversity effect enables good transmission, thereby increasing the user throughput.

BRIEF DESCRIPTION OF THE DRAWINGS

FIG. 1 is a diagram showing schematic configuration of a transmitter in accordance with First embodiment;
FIG. 2 is a diagram showing schematic configuration of a transmission signal generation part 103.

Figure 3A:
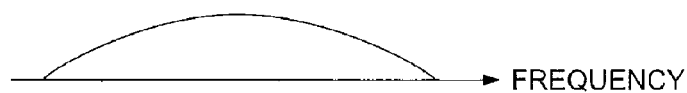
FIG. 3A is a diagram showing a spectrum after DFT.

DESCRIPTION OF REFERENCE NUMERALS 100, 100-1 to 100-s Transmitter
101 Error correction coding part
102 Interleaving part
103 Transmission signal generation part
104-1 to 104-$N_{tx}$ CP addition part
105-1 to 105-$N_{tx}$ Frame configuration part
106-1 to 106-$N_{tx}$ Reference signal generation part
107-1 to 107-$N_{tx}$ Radio transmission part
108-1 to 108-$N_{tx}$ Antenna part
110 Modulation part
111 DFT part
112 Spectrum division part
113-1 to 113-$N_{tx}$ Spectrum mapping part
114-1 to 114-$N_{tx}$ IFFT part
200 Receiver
201-1 to 201-$N_{rx}$ Antenna part
202-1 to 202-$N_{rx}$ Radio reception part
203-1 to 203-$N_{rx}$ CP removal part
204 Signal separation part
205 Demodulation part
206 Deinterleaving part
207 Error correction decoding part
210-1 to 210-$N_{rx}$ Reference signal separation part
211 Channel estimation part
212 Weight generation part
213-1 to 213-$N_{rx}$ FFT part
214 MIMO separation part
215-1 to 215-$N_{tx}$ Spectrum demapping part
216 Spectrum combining part
217 IDFT part
300 Receiver
301-1 to 301-$N_{rx}$ Antenna part
302-1 to 302-$N_{rx}$ Radio reception part 304 Signal separation part
305-1 to 305-s Demodulation part
306-1 to 306-s Deinterleaving part
307-1 to 307-s Error correction decoding part
308 P/S conversion part

BEST MODES FOR CARRYING OUT THE INVENTION

First Embodiment

In First embodiment, efficient transmission method and reception method in single carrier SU-MIMO will be described. In this description, single carrier transmission is defined as a transmission system to generate a signal in a time domain. Accordingly, although First embodiment will be described using DFT-S-OFDM as an example, the present invention can be also applied to a single carrier-based transmission system such as Clustered DFT-S-OFDM.

FIG. 1 is a diagram showing schematic configuration of a transmitter in accordance with First embodiment. This transmitter 100 is assumed to include $N_{tx}$ transmission antennas and perform single carrier transmission. In the transmitter 100, an information data sequence is input to an error correction coding part 101. The error correction coding part 101 performs error correction coding such as a convolutional code, a turbo code or an LDPC (Low Density Parity Check) code, on the input data bit sequence and outputs an obtained encoded bit sequence to an interleaving part 102. The interleaving part 102 interleaves the bit sequence to randomize the effect of the channel and outputs the rearranged bit sequence to a transmission signal generation part 103.

The transmission signal generation part 103 generates a transmission signal for each antenna. Configuration of the transmission signal generation part 103 will be described later. An output signal of the transmission signal generation part 103 is input to each of CP addition parts 104-1 to 104-$N_{tx}$ corresponding to the antennas. The CP addition parts 104-1 to 104-$N_{tx}$ add $N_{CP}$ point CP (Cyclic Prefix, which is also referred to as GI (Guard Interval)) to the input signal sequence and output the signals to frame configuration parts 105-1 to 105-$N_{tx}$. The frame configuration part 105-1 to 105-$N_{tx}$ multiplex the signals with reference signals generated by reference signal generation parts 106-1 to 106-$N_{tx}$ to constitute frames and output the frames to radio transmission parts 107-1 to 107-$N_{tx}$. The radio transmission part 107-1 to 107-$N_{tx}$ apply processing such as D/A (Digital to Analog) conversion, up-conversion and band pass filtering to the input digital signals and then transmit the processed signals from antenna parts 108-1 to 108-$N_{tx}$.

FIG. 2 is a diagram showing schematic configuration of the transmission signal generation part 103. In the transmission signal generation part 103, the input signal is input to a modulation part 110. The modulation part 110 generates $N_{DFT}$ modulation symbols according to QPSK (Quaternary Phase Shift Keying), 16 QAM (Quadrature Amplitude Modulation) or the like and outputs them to a DFT part 111. The DFT part 111 performs DFT (Discrete Fourier Transform) on the input $N_{DFT}$ modulation symbols to convert the symbols into $N_{DFT}$ point frequency domain signals and outputs them to a spectrum division part 112.

The spectrum division part 112 divides the input $N_{DFT}$ point frequency signals into signals in number corresponding to the number of antennas and outputs the divided signals to spectrum mapping parts 113-1 to 113-$N_{tx}$, respectively. For example, in the case of two antennas ($N_{tx}$=2), a frequency spectrum is divided into former ($N_{DFT}$/2) points and latter ($N_{DFT}$/2) points, and the former spectrum is output to the spectrum mapping part 113-1 and the latter spectrum is output to the spectrum mapping part 113-2. Based on allocation information from a receiver, each of the spectrum mapping parts 113-1 to 113-$N_{tx}$ corresponding to respective antennas selects arbitrary contiguous $N_{DFT}$ points from the $N_{FFT}$ points to perform spectrum allocation. Output signals of the spectrum mapping parts 113-1 to 113-$N_{tx}$ are converted into time domain signals at IFFT parts 114-1 to 114-$N_{tx}$ respectively according to IFFT (Inverse Fast Fourier Transform) of $N_{FFT}$ points. The IFFT parts 114-1 to 114-$N_{tx}$ output $N_{FFT}$ point time domain signals, respectively.

Figure 3B:
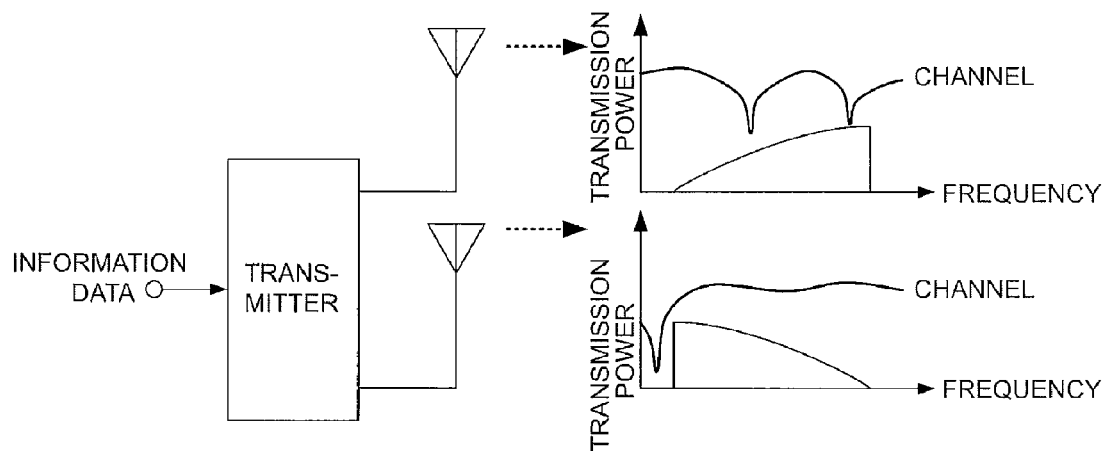
FIG. 3B is a diagram showing divided spectrums.
Figure 4:
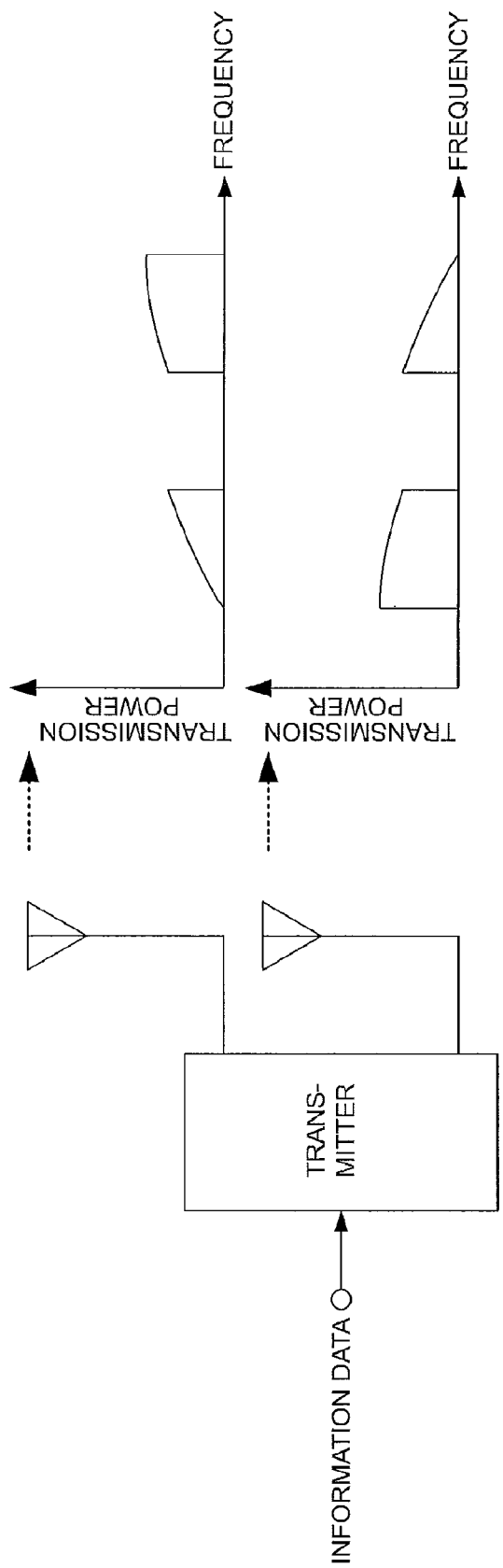
FIG. 4 is a diagram showing the state where a partial spectrum is divided on a frequency domain.

FIG. 3A is a diagram showing a spectrum after DFT and FIG. 3B is a diagram showing divided spectrums. Here, it is assumed that the number of antennas is 2 ($N_{tx}$=2). The transmitter shown in FIG. 2 thus includes one modulation part and one DFT part irrespective of the number of antennas, divides a frequency spectrum obtained by performing DFT on a modulation signal and transmits spectrums from different antennas, respectively. As a result, transmission as shown in FIG. 3B is performed. In the above description, single carrier transmission is used as an example. However, the present invention can be also applied to Clustered DFT-S-OFDM proposed in 3GPP, and in this case, as shown in FIG. 4, a partial spectrum is further divided on a frequency domain and transmitted.

Figure 5:
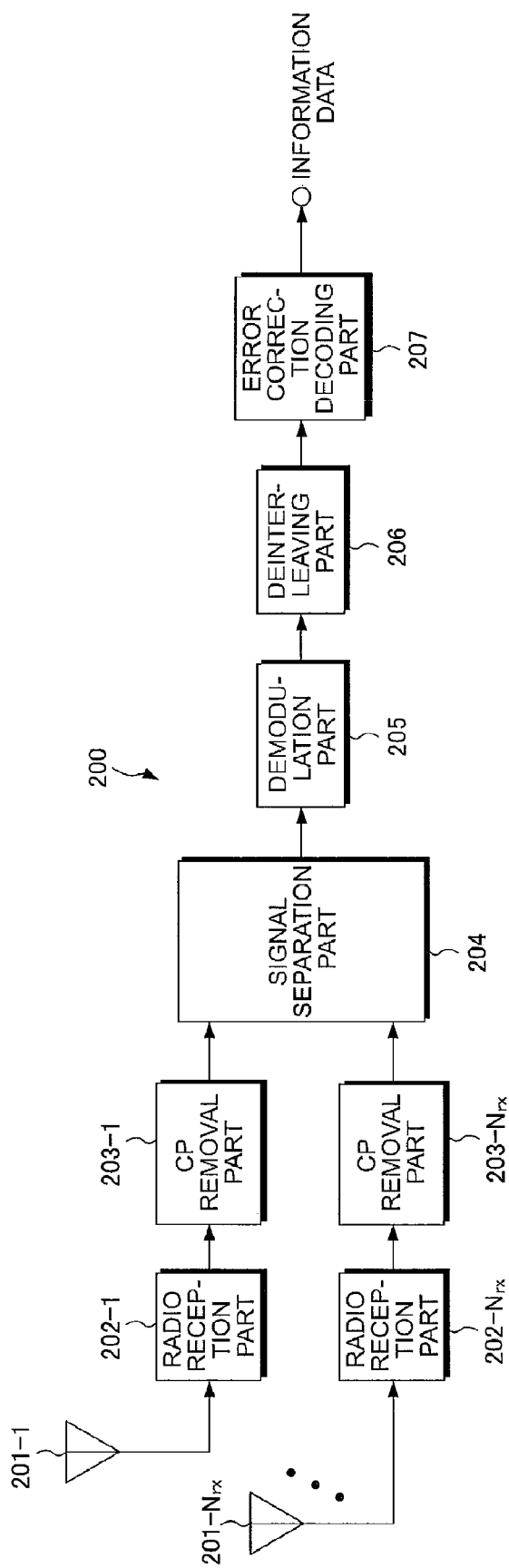
FIG. 5 is a diagram showing schematic configuration of a receiver in accordance with First embodiment.

FIG. 5 is a diagram showing schematic configuration of a receiver in accordance with First embodiment. This receiver 200 is assumed to include $N_{rx}$ reception antennas. The signals transmitted from the transmitter 100 are received by antenna parts 201-1 to 201-$N_{rx}$ of the receiver 200 through channels. The signals received by the antenna parts 201-1 to 201-$N_{rx}$ are input to radio reception parts 202-1 to 202-$N_{rx}$, respectively. The radio reception parts 201-1 to 202-$N_{rx}$ performs down-conversion, filtering processing and A/D (Analog to Digital) conversion. Outputs of the radio reception parts 201-1 to 202-$N_{rx}$ are input to CP removal parts 203-1 to 203-$N_{rx}$, respectively. Then, $N_{cp}$ point CP added in the transmitter 100 is removed from each of data signals of $N_{FFT}$+$N_{CP}$ symbols, and the signals are output to a signal separation part 204. Given that the number of the transmission antennas is $N_{tx}$, an output r(t) ($N_{rx} \times 1$ vector) of the CP removal part at a time t is represented by a following formula.

[Formula 1]

$$r(t) = \sum_{l=0}^{L-1} h_l s(t - \tau_l) + \eta(t) \quad (1)$$

Here, $$\begin{cases} s(t) = [s_0(t) \ s_1(t) \ \ldots \ s_{N_{tx}-1}(t)]^T \\ h_l = \begin{bmatrix} h_{0,0,l} & h_{0,1,l} & \cdots & h_{0,N_{tx}-1,l} \\ h_{1,0,l} & h_{1,1,l} & \cdots & h_{1,N_{tx}-1,l} \\ \vdots & \vdots & \ddots & \vdots \\ h_{N_{rx}-1,0,l} & h_{N_{rx}-1,1,l} & \cdots & h_{N_{rx}-1,N_{tx}-1,l} \end{bmatrix} \\ \eta(t) = [\eta_0(t) \ \eta_1(t) \ \ldots \ \eta_{N_{rx}-1}(t)]^T \end{cases} \quad \text{[Formula 2]}$$

Wherein, $h_{n,m,l}$ and $\tau_l$ are complex channel gain between $m^{th}$ transmission antenna and $n^{th}$ reception antenna and delay time in $l^{th}$ path, respectively, $s_m(t)$ is the transmission signal from the $m^{th}$ transmission antenna at the time t and $\eta n_n(t)$ is a thermal noise in the $n^{th}$ reception antenna.

The signal separation part 204 performs signal separation and channel compensation on the signals input from the respective antenna parts 201-1 to 201-$N_{rx}$ and outputs the resultant signals to a demodulation part 205. Processing in the signal separation part 204 will be described later. The signal output from the signal separation part 204 is demodulated by the demodulation part 205 based on the modulation performed in the transmitter. Further, a deinterleaving part 206 performs processing to deinterleave the bit sequence interleaved in the transmitter, and then an error correction decoding part 207 performs error correction decoding processing to obtain the transmitted information bit sequence.

Figure 6:
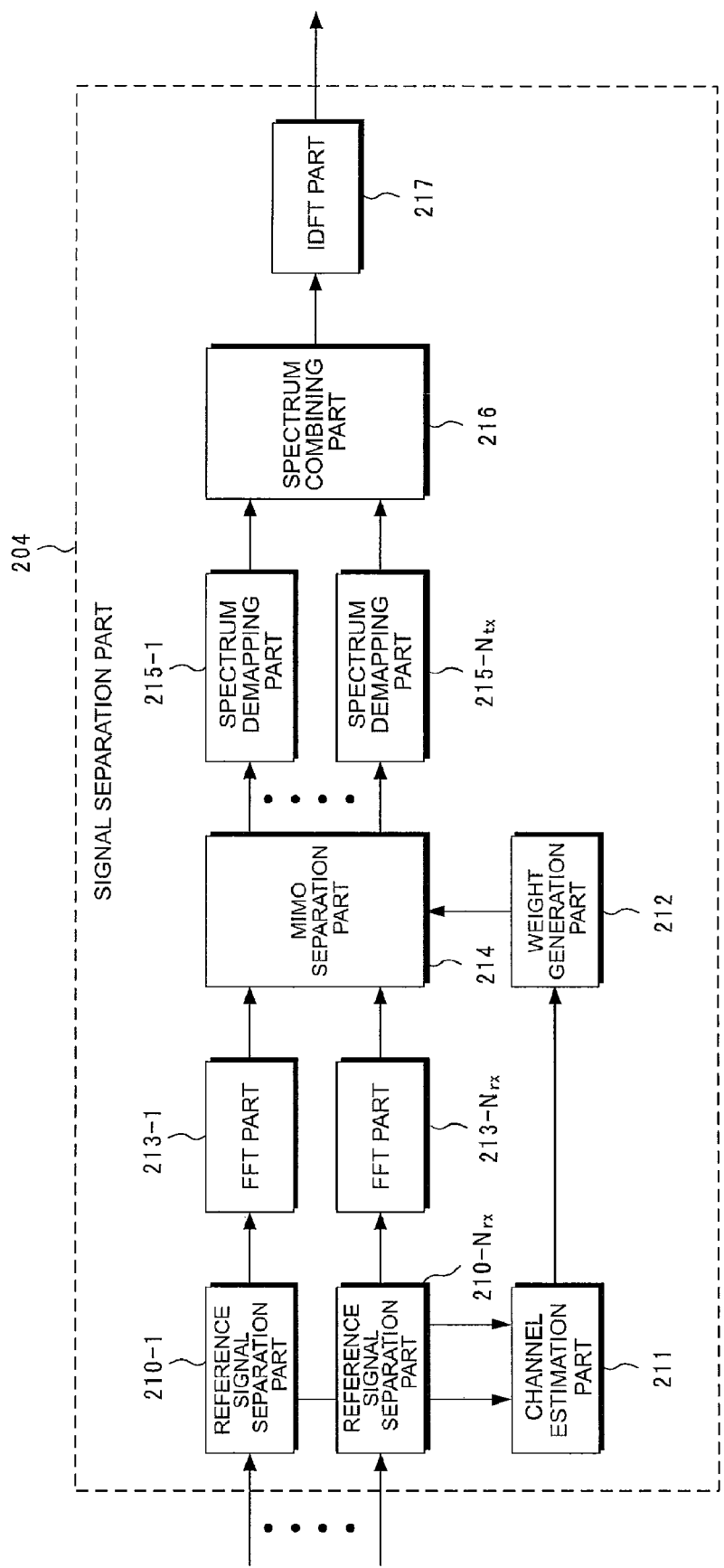
FIG. 6 is a diagram showing schematic configuration of a signal separation part.

FIG. 6 is a diagram showing schematic configuration of the signal separation part. The signals input from the antenna parts 201-1 to 201-$N_{rx}$ are input to reference signal separation parts 210-1 to 210-$N_{rx}$ corresponding to the antennas, respectively. The reference signal separation parts 210-1 to 210-$N_{rx}$ each separate a reference signal from a data signal. The data signals separated by the reference signal separation parts 210-1 to 210-$N_{rx}$ are input to FFT parts 213-1 to 213-$N_{rx}$, respectively. The FFT parts 213-1 to 213-$N_{rx}$ convert the data signals into $N_{FFT}$ point frequency domain signals by applying $N_{FFT}$ point FFT.

A frequency domain reception signal vector in a $k^{th}$ subcarrier R(k) ($N_{rx} \times 1$ vector), which is obtained by performing FFT on the formula 2, is represented as a following formula.

[Formula 3]

$$R(k) = H(k)S(k) + \Pi(k) \quad (3)$$

Here,

[Formula 4]

$$\begin{cases} S(k) = [S_0(k)\ S_1(k)\ \ldots\ S_{N_{tx}-1}(k)]^T \\ \quad = \sum_{t=0}^{N_{FFT}-1} s(t)\exp(-j2\pi kt/N_{FFt}) \\ H(k) = \begin{bmatrix} H_{0,0}(k) & H_{0,1}(k) & \ldots & H_{0,N_{tx}-1}(k) \\ H_{1,0}(k) & H_{1,1}(k) & \ldots & H_{1,N_{tx}-1}(k) \\ \vdots & \vdots & \ddots & \vdots \\ H_{N_{rx}-1,0}(k) & H_{N_{rx}-1,1}(k) & \ldots & H_{N_{rx}-1,N_{tx}-1}(k) \end{bmatrix} \\ \quad = \sum_{t=0}^{N_{FFT}-1} h_t\exp(-j2\pi kt/N_{FFT}) \\ \Pi(k) = \left[\prod_0(k)\ \prod_1(k)\ \ldots\ \prod_{N_{rx}-1}(k)\right]^T \\ \quad = \sum_{t=0}^{N_{FFT}-1} \eta(t)\exp(-j2\pi kt/N_{FFT}) \end{cases} \quad (4)$$

Wherein, $H_{n,m}(k)$ constituting channel matrix of the $k^{th}$ subcarrier H(k) ($N_{rx} \times N_{tx}$ matrix) represents a channel between an $m^{th}$ transmission antenna and an $n^{th}$ reception antenna, $S_m(k)$ represents a transmission spectrum of the $k^{th}$ subcarrier in the $m^{th}$ transmission antenna and $\Pi_n(k)$ represents a noise component of the $k^{th}$ subcarrier in the $n^{th}$ reception antenna. The frequency domain signals as outputs of the FFT parts are input to a MIMO separation part 214.

Meanwhile, the reference signals separated by the reference signal separation parts 210-1 to 210-$N_{rx}$ are input to a channel estimation part 211, which estimates a channel matrix H(k) ($N_{rx} \times N_{tx}$ matrix) in the formula 4 and estimates an average noise power in each of the antenna parts 201-1 to 201-$N_{rx}$. A channel matrix estimated value (represented by a formula (5)) and an average noise power estimated value σ2, which are calculated by the channel estimation part 211, are input to a weight generation part 212.

[Formula 5]

$$\hat{H}(k) \quad (5)$$

The weight generation part 212 calculates an MMSE (Minimum Mean Square Error) weight, a ZF (Zero Forcing) weight or the like as weight for MIMO separation. For example, a MMSE weight matrix w(k) ($N_{tx} \times N_{rx}$ matrix) is represented as a following formula.

[Formula 6]

$$w(k) = \hat{H}^H(k)(\hat{H}(k)\hat{H}^H(k) + \sigma^2 I)^{-1} \quad (6)$$

Wherein, I represents a unit matrix of $N_{rx} \times N_{rx}$ and $(\bullet)^H$ represents an Hermitian transposed adjoint matrix.

The obtained weight is input to the MIMO separation part 214. The MIMO separation part 214 performs MIMO separation by using the signals input from the FFT parts 213-1 to 213-$N_{rx}$ and the weight input from the weight generation part 212. The MIMO separation part performs MIMO separation by multiplying the weight matrix w(k) ($N_{tx} \times N_{rx}$ matrix) and a vector R(k) ($N_{rx} \times 1$ vector). The frequency domain signal vector ($N_{tx} \times 1$ vector) of each user after separation is represented as a following formula.

[Formula 7]

$$\tilde{R}(k) = w(k)R(k) \quad (7)$$

The MIMO separation part 214 outputs frequency domain signals for the $N_{tx}$ antennas. The MIMO-separated frequency domain signals are input to spectrum demapping parts 215-1 to 215-$N_{tx}$, and frequency spectrums used in transmission are extracted and output to a spectrum combining part 216.

The spectrum combining part 216 performs processing to combine the signals divided for the respective antennas on the transmission side. For example, when the number of the transmission antennas in the transmitter is two and each antenna transmits divided ($N_{DFT}/2$) point spectrums, each of the spectrum demapping parts 215-1 to 215-2 ($N_{tx}=2$) extracts the used ($N_{DFT}/2$) points from $N_{FFT}$ point frequency components and outputs them to the spectrum combining part 216. The spectrum combining part 216 combines the ($N_{DFT}/2$) point outputs output from the respective spectrum demapping parts 215-1 to 215-2 to form $N_{DFT}$ point frequency signals. An output of the spectrum combining part 216 is input to an IDFT part 217, which performs IDFT to convert the input signal into an $N_{DFT}$ point time domain signal for output.

By dividing the spectrum of the single carrier and transmitting the multiplexed signals from the respective antennas in this manner, one modulation signal can be transmitted using a lot of antennas. As a result, MIMO transmission having the transmission antenna diversity effect can be realized. For example, as shown in FIG. 3A and FIG. 3B, even when a gain of the antenna 1 is low, if a gain of the antenna 2 is high, likelihood of the whole signal can be improved by combining spectrums. Thereby, good transmission can be realized. This is due to that one modulation signal can be transmitted using a lot of antennas. This transmission antenna diversity effect enables good transmission, thereby increasing the user throughput. Further, when Clustered DFT-S-OFDM is adopted in LTE-A, compatibility with the transmission system without adopting MIMO is improved.

Second Embodiment

First embodiment shows the case where the number of error correction coding parts is one. However, in a downlink in LTE, the transmitter includes a plurality of error correction coding parts to generate a plurality of code words. The coding parts are provided in order to perform MIMO separation by SIC (Successive Interference Cancellation) in the receiver and to decrease excessive retransmission by requesting retransmission for each code word.

Figure 7:
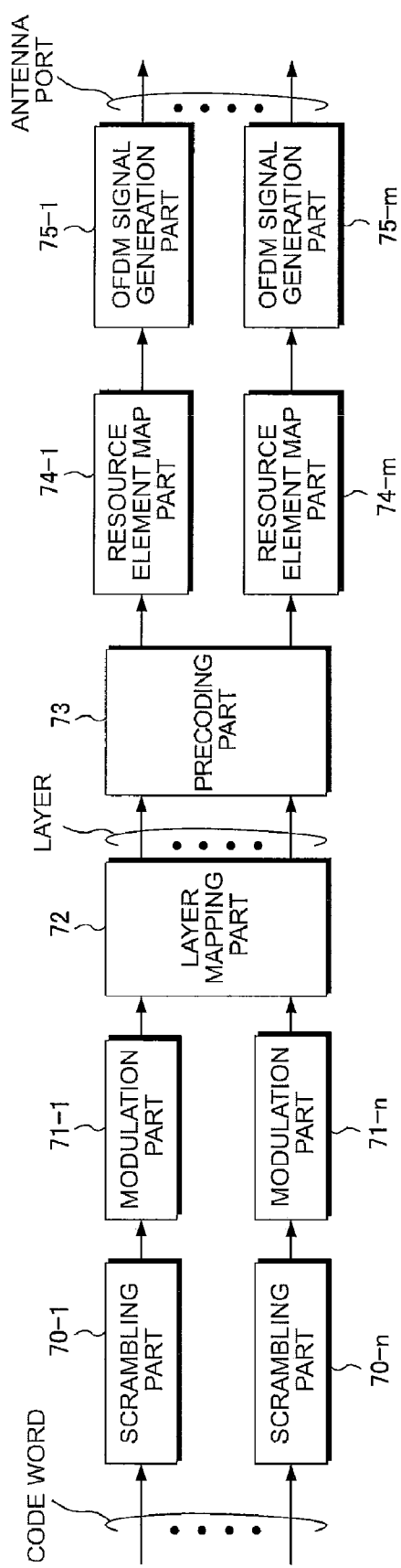
FIG. 7 is a diagram showing a part of a transmitter proposed in LTE.

FIG. 7 is a diagram showing a part of a transmitter standardized in LTE. In FIG. 7, the description is provided assuming that the number of code words is n and the number of transmission antennas is m. Scrambling parts 70-1 to 70-n scramble transmission data by using known signals. Modulation parts 71-1 to 71-n modulate signals input from the scrambling parts 70-1 to 70-n by QPSK (Quaternary Phase Shift Keying), 16 QAM (Quadrature Amplitude Modulation) or the like. When the number of layers is larger than the number of code words, a layer mapping part 72 distributes the input signals to respective layers. A precoding part 73 converts the time domain signals input from the layer mapping part 72 into frequency domain signals, for example, by DFT (Discrete Fourier Transform). Resource element map parts 74-1 to 74-m collectively map the input signals for each DFT point in the frequency domain. Based on the input signals, OFDM signal generation parts 75-1 to 75-m generate and output OFDM signals.

As shown in FIG. 7, in LTE, when the number of code words and the number of layers are not changed by layer mapping, each antenna (antenna port) is specified to transmit a signal for each code word. In Second embodiment, the description is provided for the case where a plurality of code words exists.

Figure 8:
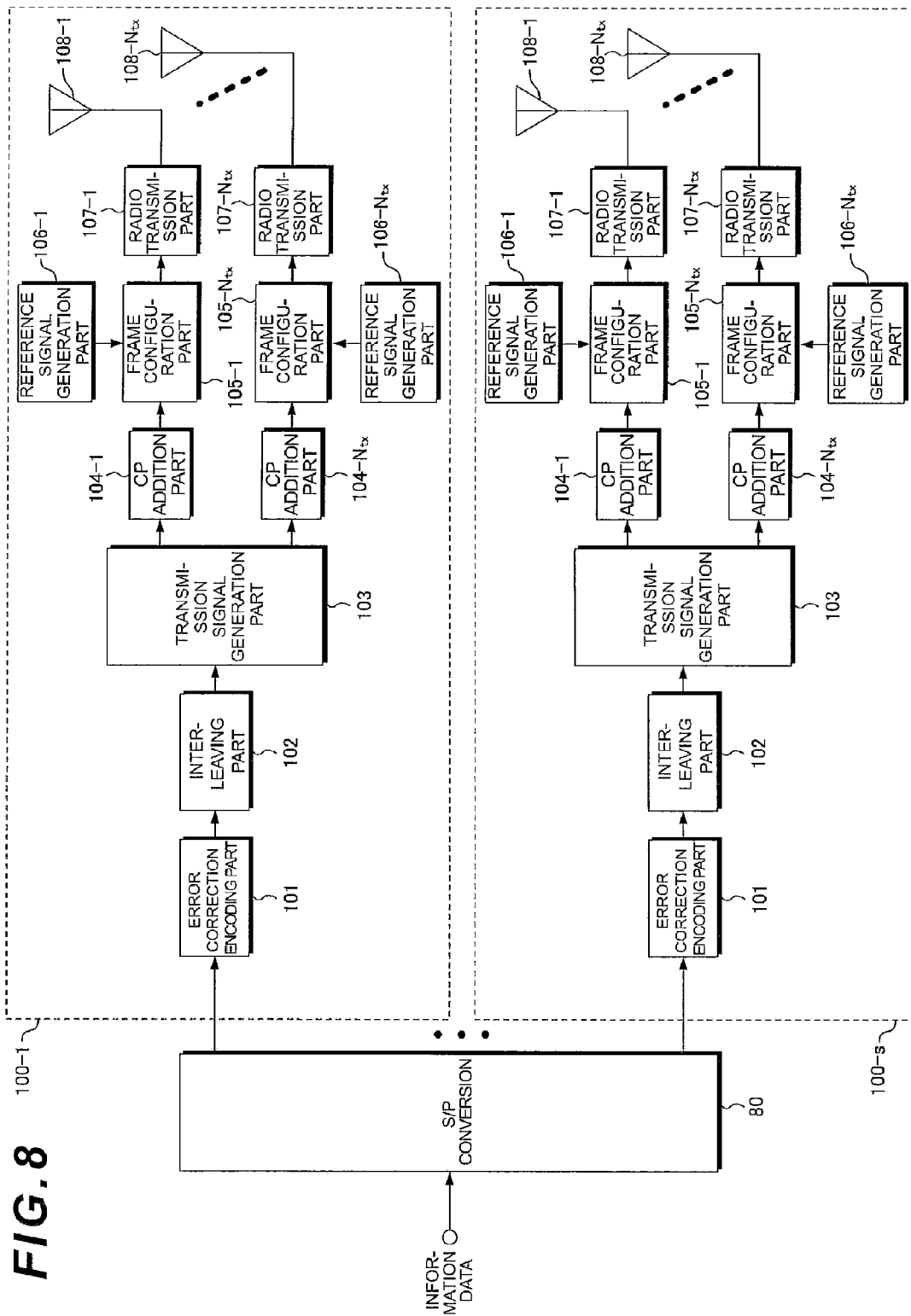
FIG. 8 is a diagram showing configuration of a transmitter in accordance with Second embodiment.

FIG. 8 is a diagram showing configuration of a transmitter in accordance with Second embodiment. An information data sequence is input to a S/P conversion part 80. The S/P conversion part 80 performs S/P conversion according to the number of code words. Here, it is assumed that the number of code words is s and the number of transmitters of First embodiment is s (100-1 to 100-s). When the number of code words is 1, processing in this embodiment is the same as that described in First embodiment. S/P converted information data is input to each error correction coding part 101 for each code word. Signal processing in the parts subsequent to the error correction coding part 101 is the same as that in First embodiment.

Figure 9:
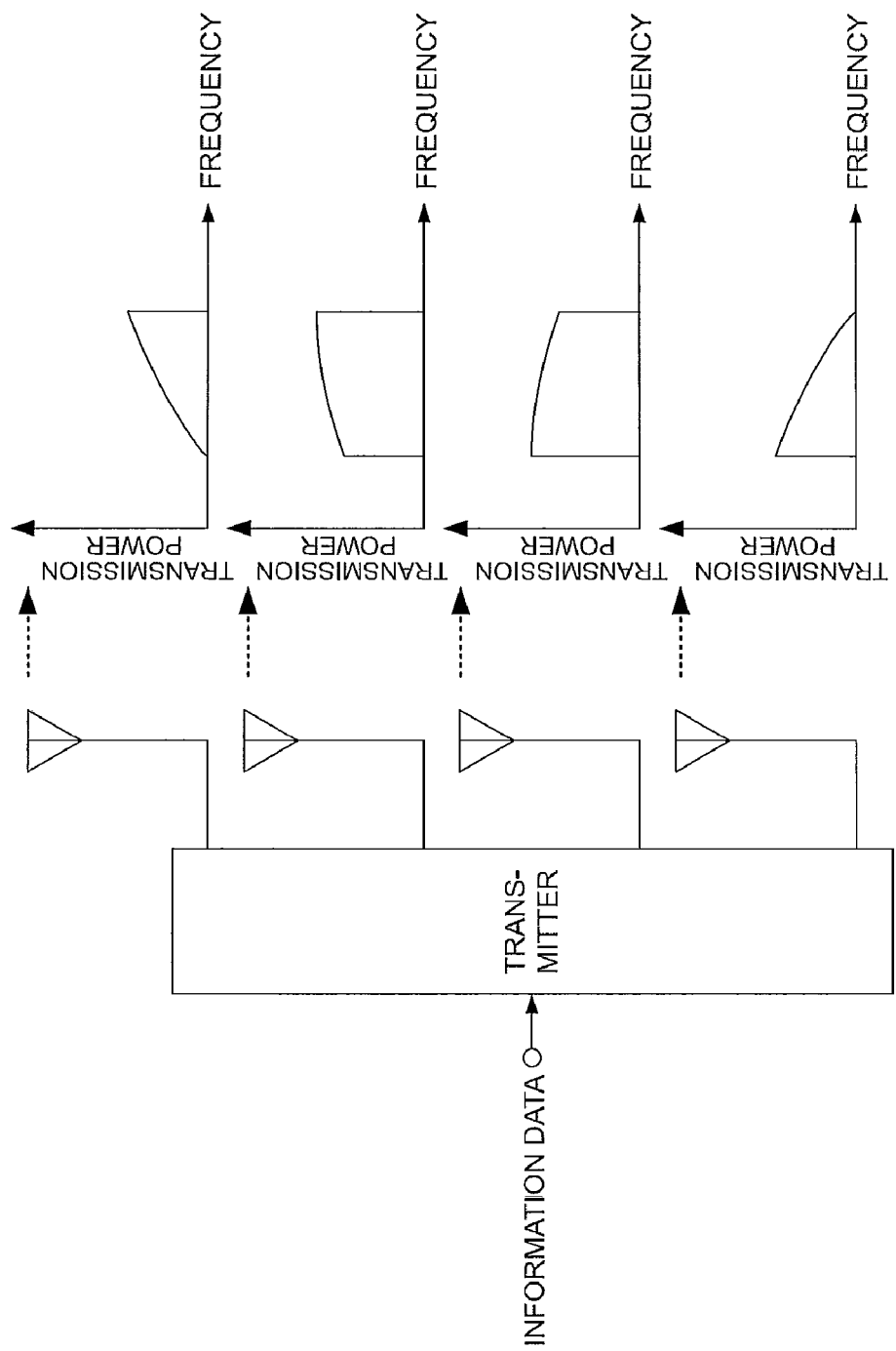
FIG. 9 is a diagram showing concept of a transmission spectrum in the case where the number of code words is 1 and the number of transmission antennas is 4.
Figure 10:
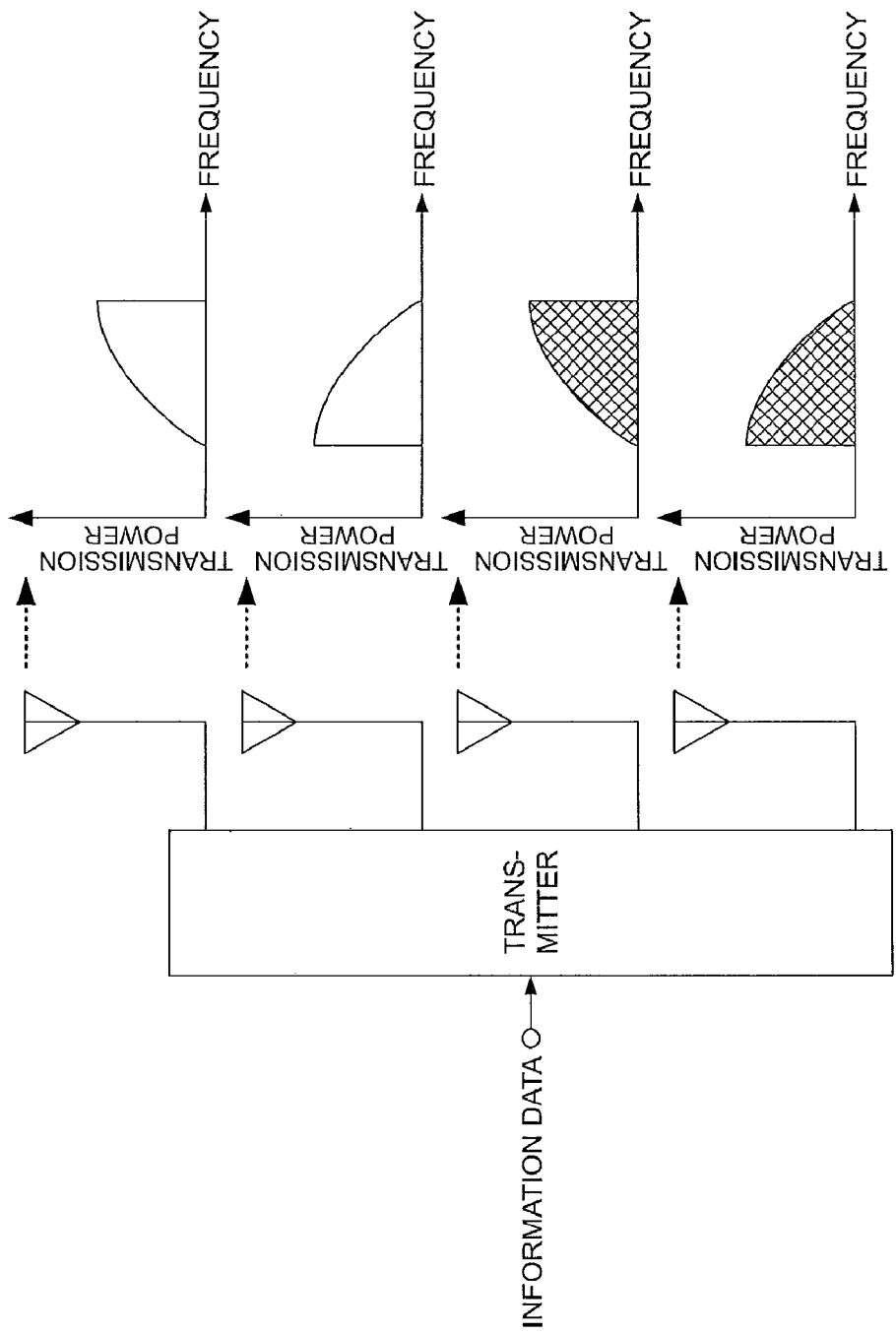
FIG. 10 is a diagram showing concept of a transmission spectrum in the case where the number of code words is 2 and the number of transmission antennas is 4.
Figure 11:
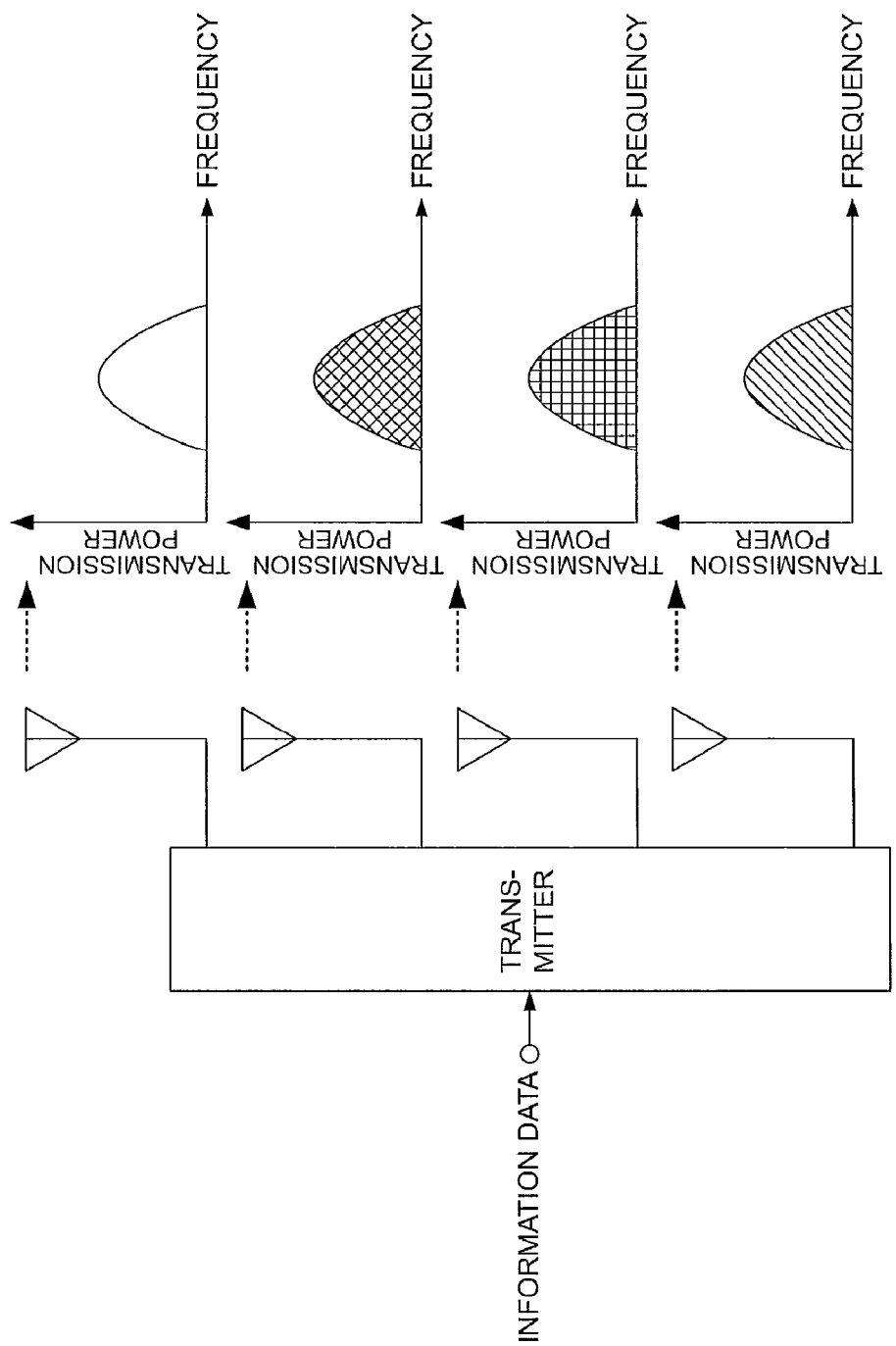
FIG. 11 is a diagram showing concept of a transmission spectrum in the case where the number of code words is 4 and the number of transmission antennas is 4.

FIG. 9 is a diagram showing concept of the transmission spectrum when the number of code words is 1 and the number of transmission antennas is 4. Each antenna transmits a partial spectrum of one code word. FIG. 10 is a diagram showing concept of the transmission spectrum when the number of code words is 2 and the number of transmission antennas is 4. The antennas 1 and 2 transmit a partial spectrum of the first code word and the antennas 3 and 4 transmit a partial spectrum of the second code word. FIG. 11 is a diagram showing concept of the transmission spectrum when the number of code words is 4 and the number of transmission antennas is 4. Each antenna transmits whole spectrum of one code word, which is equivalent to the conventional transmission method.

Figure 12:
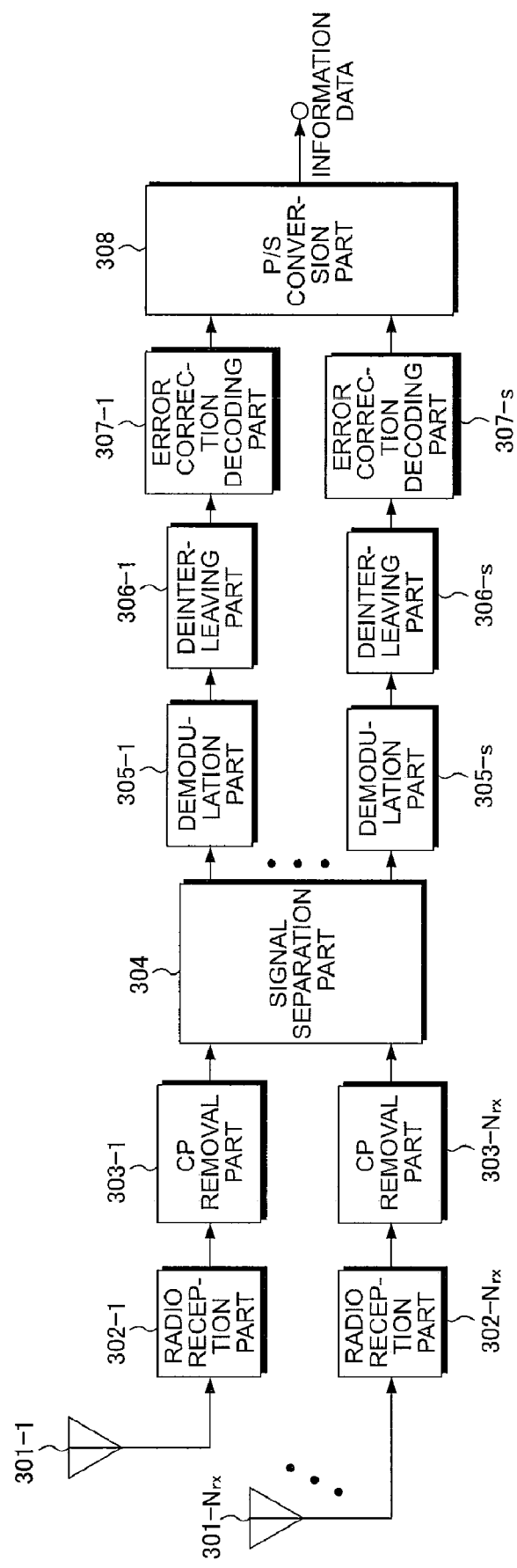
FIG. 12 is a diagram showing configuration of a receiver in accordance with Second embodiment.

FIG. 12 is a diagram showing configuration of a receiver in accordance with Second embodiment. This receiver 300 is assumed to include $N_{rx}$ reception antennas. Signals received by respective antenna parts 301-1 to 301-$N_{rx}$ are processed in radio reception parts 302-1 to 302-$N_{rx}$ and CP removal parts 303-1 to 303-$N_{rx}$, as in First embodiment, and input to a signal separation part 304. In First embodiment, since the number of code words is 1, the signal separation part 304 outputs only one sequence. However, in Second embodiment, the signal separation part 304 outputs sequences for the number of code words to demodulation parts 305-1 to 305-s. The output signals are demodulated by demodulation parts 305-1 to 305-s for each code word, deinterleaved by deinterleaving parts 306-1 to 306-s, subjected to error correction decoding by error correction decoding parts 307-1 to 307-s, and then input to a P/S conversion part 308. The P/S conversion part 308 performs processing to arrange parallel-processed code words in series. An output of the P/S conversion part 308 is delivered to an upper layer as information data.

As described above, even when the number of transmission antennas is constant, the transmission method of the partial spectrum can be changed according to the number of code words. For example, as shown in FIG. 9, by transmitting one code word by four partial spectrums, the transmission antenna diversity effect of four antennas can be obtained. As a result, good transmission performances can be expected. Further, as shown in FIG. 10, by dividing two code words into two respectively and transmitting the cord words by four antennas, each code word can obtain the diversity effect of two transmission antennas, and therefore, good transmission performances can be expected. Furthermore, for each code word, the modulation scheme and the coding rate can be determined and retransmission request can be made. In addition, since SIC can be also achieved for each code word, flexible control becomes possible.

Third Embodiment

In Third embodiment, efficient transmission method and reception method to determine the number of used frequency bands according to the number of code words will be described. In this specification, the code word is defined as the number of blocks included in one transmission event and subjected independently to error correction coding. Single carrier transmission is defined as a transmission system to generate a signal in the time domain. A specific example of the case where the number of code words is made equal to the number of used frequency bands so that there is a one-to-one correspondence between the code word and the used frequency band will be described below.

Figure 13:
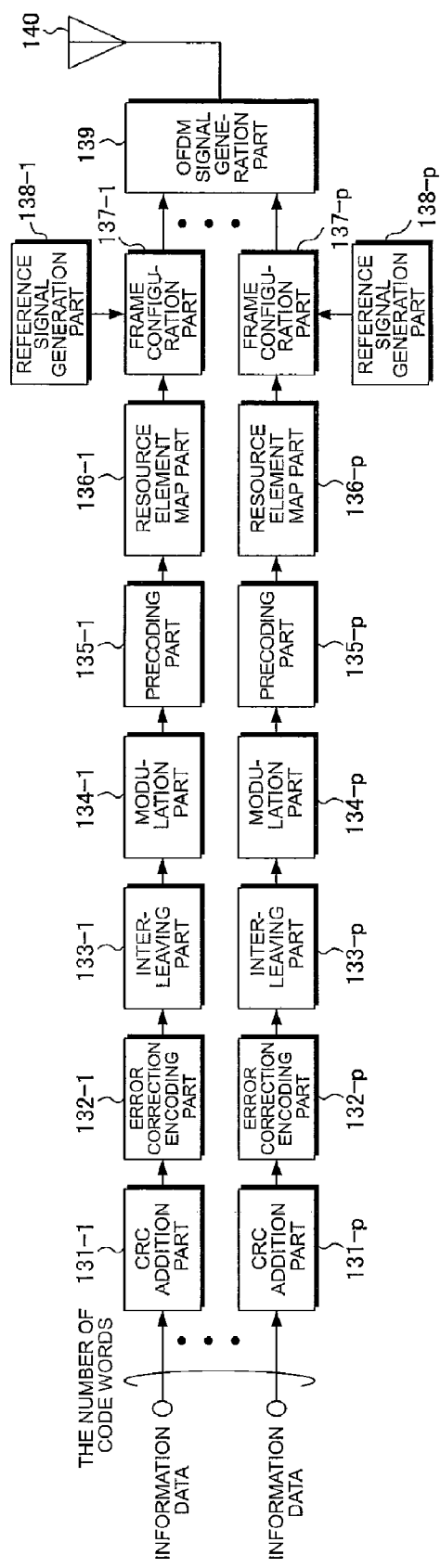
FIG. 13 is a diagram showing configuration of a transmitter in accordance with Third embodiment.

FIG. 13 is a diagram showing configuration of a transmitter in accordance with Third embodiment. Here, it is assumed that the number of code words is p. In a transmitter 130, information data sequences for the number of code words are input to CRC addition parts 131-1 to 131-p, respectively. The CRC addition parts 131-1 to 131-p perform processing to generate CRC (Cyclic Redundancy Check) from the information data and add the CRC to the information data. Outputs of the CRC addition parts 131-1 to 131-p are input to the error correction coding parts 132-1 to 132-p, respectively. The error correction coding parts 132-1 to 132-p perform error correction coding such as a convolutional code, a turbo code or an LDPC (Low Density Parity Check) code on the input data bit sequences. Here, the coding rate can be also changed for each code word. Obtained encoded bit sequences are output to interleaving parts 133-1 to 133-p, respectively.

The interleaving parts 133-1 to 133-p interleave the bit sequences to randomize the effect of the channel and output them to modulation parts 134-1 to 134-p, respectively. The modulation parts 134-1 to 134-p generate $N_{DFT}$ modulation symbols such as QPSK (Quaternary Phase Shift Keying) and 16 QAM (Quadrature Amplitude Modulation) and output the symbols to precoding parts 135-1 to 135-p, respectively. The modulation scheme can be changed for each code word. The precoding parts 135-1 to 135-$p$ perform precoding such as DFT (Discrete Fourier Transform) on the input $N_{DFT}$ modulation symbols and output $N_{DFT}$ point frequency domain signal to resource element map parts 136-1 to 136-$p$.

The resource element map parts 136-1 to 136-$p$ allocate spectrum (resource element) to $N_{FFT}$ point frequencies. According to the allocation method, the spectrum may be allocated to any arbitrary frequencies continuously or discontinuously. In 3GPP, the transmission system to perform continuous allocation is discussed as N×DFT-S-OFDM and the transmission system to perform discontinuous allocation is discussed as N×Clustered DFT-S-OFDM. When the channel state information is known on the transmission side, the spectrum may be allocated to frequencies having a high gain continuously or discontinuously.

Zero is input to unallocated frequency points ($N_{FFT}$–$N_{DFT}$ points) and signals are output to frame configuration parts 137-1 to 137-$p$. The frame configuration parts 137-1 to 137-$p$ multiplex reference signals generated by reference signal generation parts 138-1 to 138-$p$ with signals output from the resource element map parts 136-1 to 136-$p$ to constitute frames. Outputs of the frame configuration parts 137-1 to 137-$p$ are output to an OFDM signal generation part 139 for each $N_{FFT}$. That is, frequency signals for the number of code words are input to the OFDM signal generation part 139. The OFDM signal generation part 139 receives inputs of a plurality of frequency domain signals, performs OFDM modulation and generates a time domain analog waveform. The time domain analog waveform is transmitted from an antenna part 140.

Figure 14:
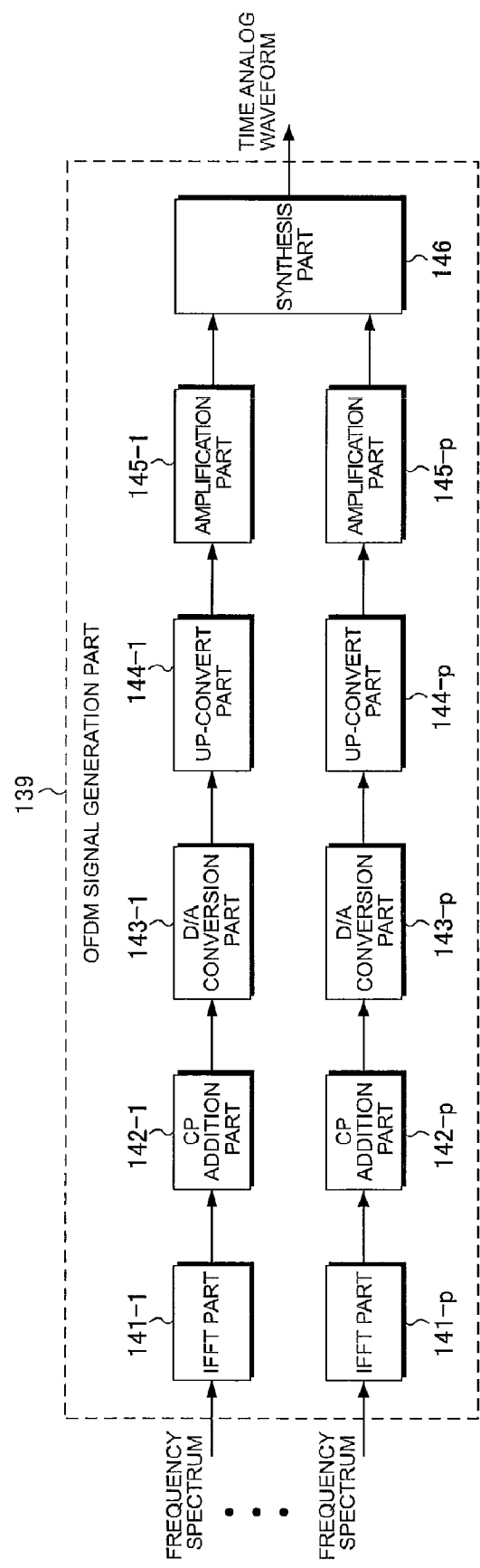
FIG. 14 is a diagram showing configuration of an OFDM signal generation part in FIG. 13.

FIG. 14 is a diagram showing configuration of the OFDM signal generation part 139 in FIG. 13. $N_{FFT}$ point frequency spectrum are transmitted to IFFT parts 141-1 to 141-$p$ in the OFDM signal generation part 139 for each code word. In the IFFT parts 141-1 to 141-$p$, the spectrums are converted to $N_{FFT}$ point time domain signals by IFFT (Inverse Fast Fourier Transform). The $N_{FFT}$ point time domain signal as outputs of the IFFT parts 141-1 to 141-$p$ are input to CP addition parts 142-1 to 142-$p$, and $N_{CP}$ points in the rear of the input $N_{FFT}$ point time domain signal are copied and added in front of the $N_{FFT}$ point time domain signal to obtain ($N_{FFT}+N_{CP}$) point time signal. Outputs of the CP addition parts 142-1 to 142-$p$ are input to D/A conversion parts 143-1 to 143-$p$, and D/A (Digital to Analog) converted.

Outputs of the D/A conversion parts 143-1 to 143-$p$ are input to up-convert parts 144-1 to 144-$p$ respectively to be up-converted from base band to carrier frequency. At this time, the outputs are up-converted to frequencies that differ for each code word. Outputs of the up-convert parts 144-1 to 144-$p$ are input to amplification parts 145-1 to 145-$p$ to be amplified to signals with predetermined amplitude (power). Outputs of the amplification parts, which are obtained for each code word, are input to a synthesis part 146. The synthesis part 146 outputs synthesized time domain analog waveform.

Figure 15:
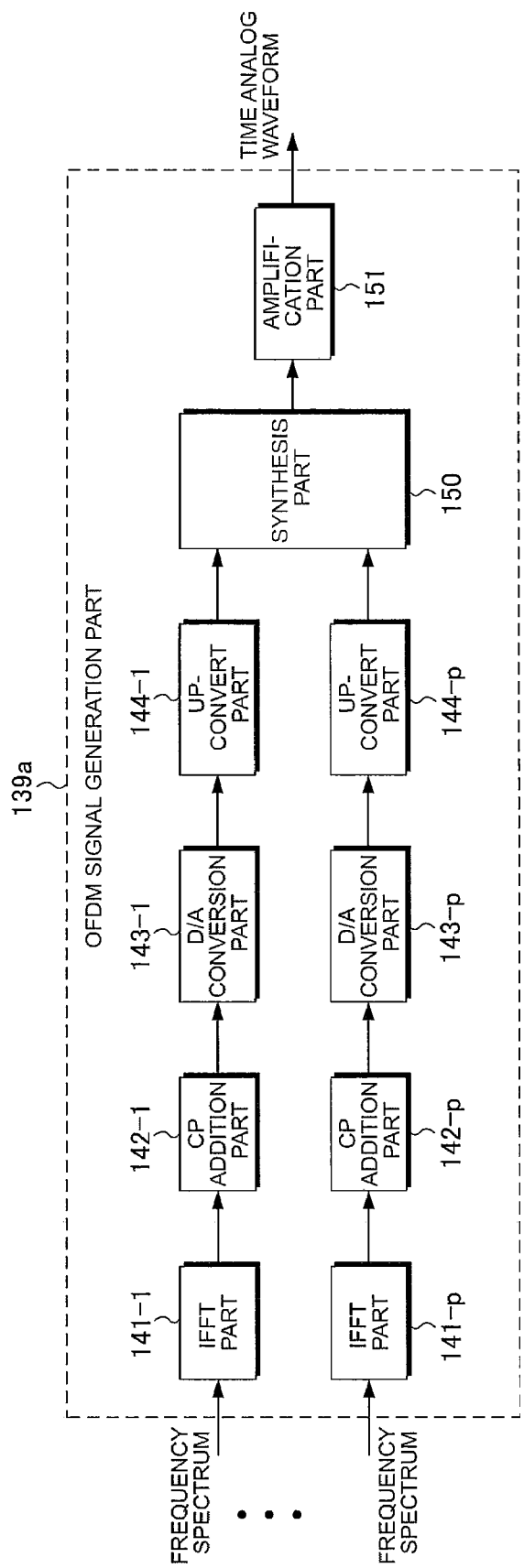
FIG. 15 is a diagram showing another configuration of the OFDM signal generation part.

In FIG. 14, the OFDM signal generation part 139 is configured so that the outputs of the amplification parts 145-1 to 145-$p$ are input to the synthesis part 146. However, as shown in FIG. 15, an OFDM signal generation part 139$a$ may be configured so that time domain analog waveforms output from the up-convert parts 144-1 to 144-$p$ are input to a synthesis part 150 and the synthesis part 150 synthesizes signals for the number of code words and inputs the synthesized signal to one amplifier 151.

Figure 16:
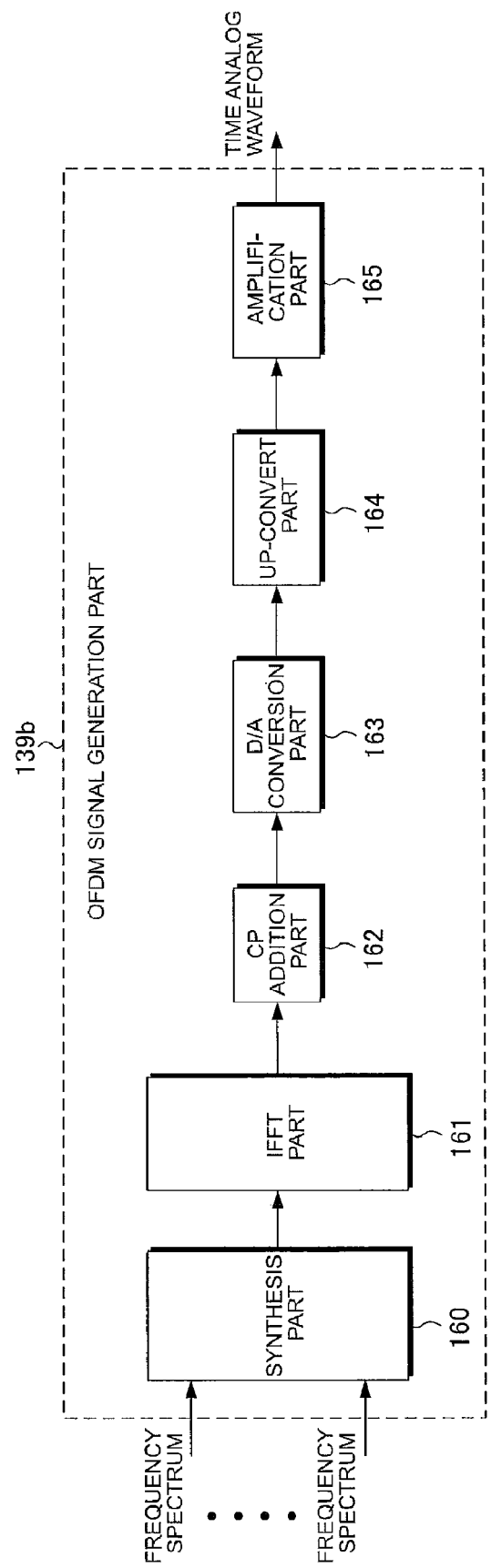
FIG. 16 is a diagram showing still another configuration of the OFDM signal generation part.

Further, as shown in FIG. 16, an OFDM signal generation part 139$b$ may be configured so that a frequency spectrum for each code word is input to a synthesis part 160. At this time, the synthesis part 160 synthesizes the spectrums in the frequency domain and inputs the synthesized spectrum to an IFFT part 161. At this time, the IFFT generally requires the size that is the number of code words times as much as the IFFT shown in FIG. 14 and FIG. 15.

Although the single carrier-based signal is described in this embodiment, OFDM (Orthogonal Frequency Division Multiplexing) can be used as the transmission system.

Figure 17:
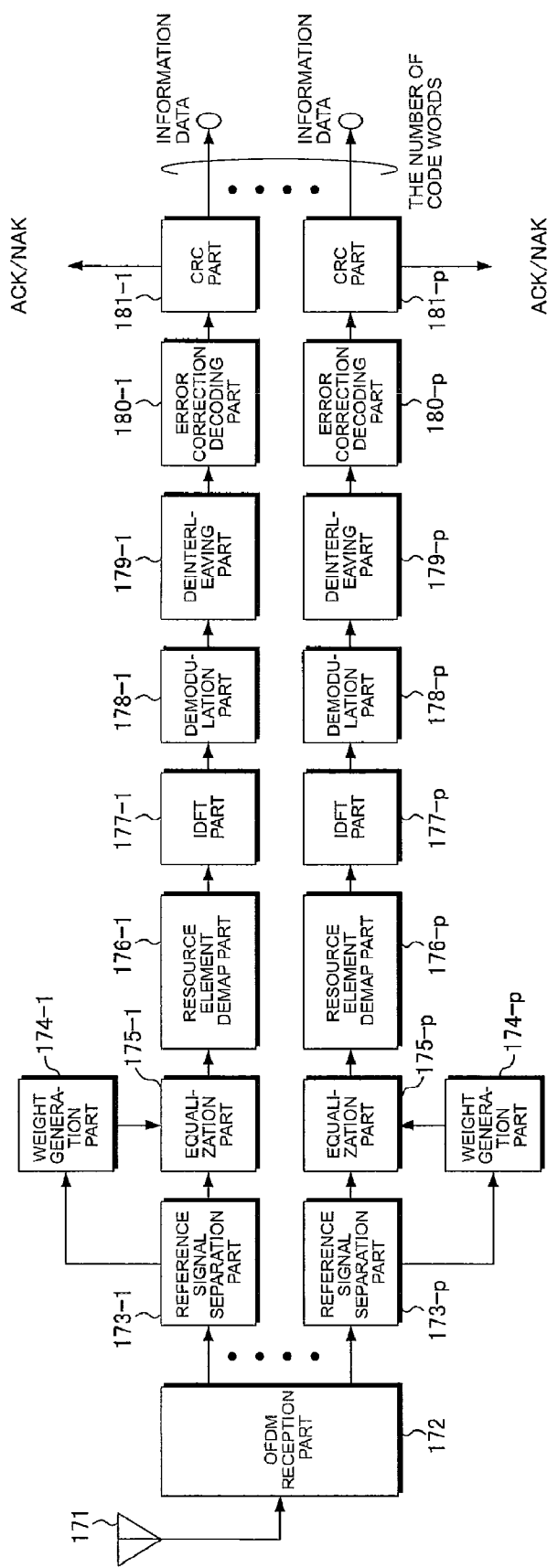
FIG. 17 is a diagram showing configuration of a receiver in accordance with Third embodiment.

FIG. 17 is a diagram showing configuration of a receiver in accordance with Third embodiment. A signal transmitted from the transmitter is received by an antenna part 171 of the receiver 170 through a channel. The signal received by the antenna part 171 is input to an OFDM reception part 172. The OFDM reception part 172 receives an input of time domain analog waveform, generates $N_{FFT}$ point frequency spectrums for each code word and inputs the frequency spectrums to reference signal separation parts 173-1 to 173-$p$, respectively. Configuration of the OFDM reception part 172 will be described later. Based on whether each of the input $N_{FFT}$ point frequency spectrums is a reference signal or a data signal, the reference signal separation parts 173-1 to 173-$p$ input the reference signals to weight generation parts 174-1 to 174-$p$ and input the data signals to equalization parts 175-1 to 175-$p$, respectively.

The weight generation parts 174-1 to 174-$p$ generate MMSE (Minimum Mean Square Error) weight or ZF (Zero Forcing) weight in the $N_{FFT}$ point frequency domain by using input weight signals and input the weight to the equalization parts 175-1 to 175-$p$, respectively. The equalization parts 175-1 to 175-$p$ multiply the $N_{FFT}$ point data signals input from the reference signal separation parts 173-1 to 173-$p$ by the $N_{FFT}$ point frequency weight input from the weight generation parts 174-1 to 174-$p$. The signals multiplied by the equalization parts 175-1 to 175-$p$ are subjected to processing to extract $N_{DFT}$ point spectrum (resource element) selected in the resource element map parts of the transmitter by resource element demap parts 176-1 to 176-$p$, respectively.

The frequency spectrums extracted by the resource element demap parts 176-1 to 176-$p$ are input to IDFT parts 177-1 to 177-$p$, respectively. The IDFT parts 177-1 to 177-$p$ applies IDFT (Inverse Discrete Fourier Transfrom) of $N_{DFT}$ points to convert the spectrums into $N_{DFT}$ point time domain signals. Outputs of the IDFT parts 177-1 to 177-$p$ are input to demodulation parts 178-1 to 178-$p$, respectively. The demodulation parts 178-1 to 178-$p$ perform processing to output bit LLR (Log Likelihood Ratio) according to the modulation scheme of the transmitter. Deinterleaving parts 179-1 to 179-$p$ restore the interleaving processing in the transmitter and then, error correction decoding parts 180-1 to 180-$p$ perform error correction decoding processing.

Outputs of the error correction decoding parts 180-1 to 180-$p$ are input to CRC parts 181-1 to 181-$p$, respectively. The CRC parts 181-1 to 181-$p$ inspect whether or not frames are correctly decoded by CRC (Cyclic Redundancy Check) added in the transmitter. When the frames are correctly decoded, the CRC parts inform ACK (ACKnowledge) to the transmitter. When it is detected by CRC that the frames are not correctly decoded, the CRC parts inform NAK (Negative AcK) to the transmitter. The correctly decoded code word is delivered to an upper layer as information data.

Figure 18:
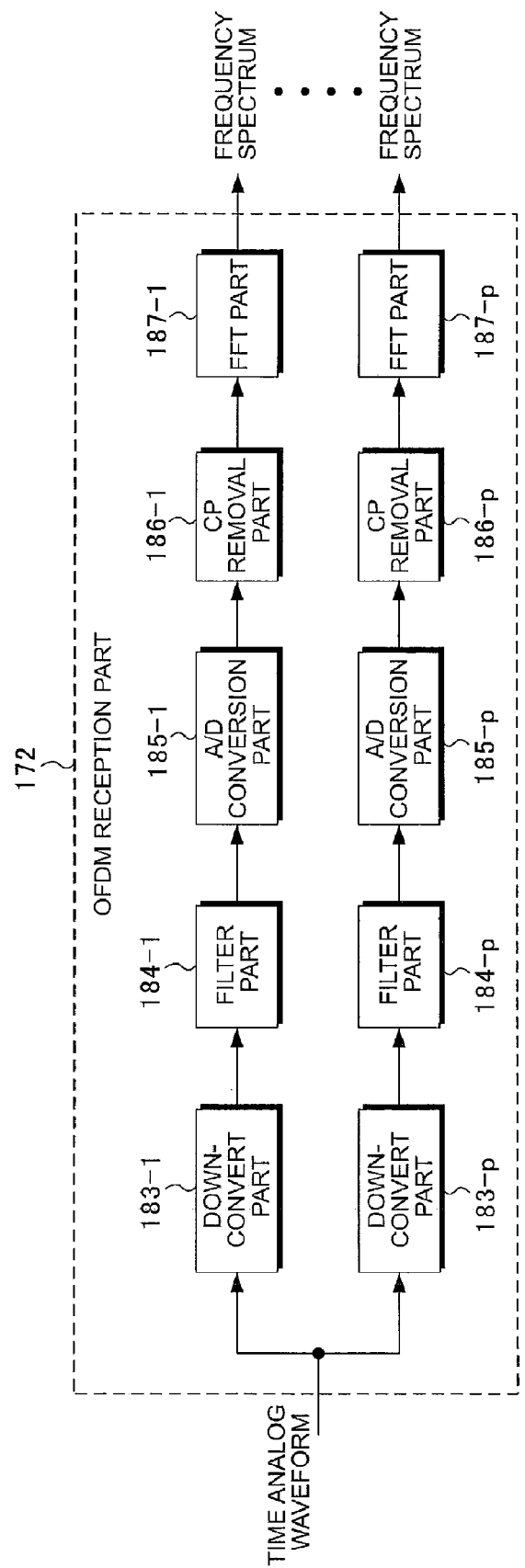
FIG. 18 is a diagram showing configuration of an OFDM reception part in FIG. 17.

FIG. 18 is a diagram showing configuration of the OFDM reception part 172 shown in FIG. 17. The time domain analog waveform input to the OFDM reception part 172 is input to down-convert parts 183-1 to 183-$p$ for the number of code words. The down-convert parts 183-1 to 183-$p$ perform down-conversion from carrier frequency used in transmission of each code word. Outputs of the down-convert parts 183-1 to 183-$p$ are input to filter parts 184-1 to 184-$p$ respectively and frequency components other than the transmission frequency band are removed. Outputs of the filter parts 184-1 to 184-$p$ are input to A/D conversion parts 185-1 to 185-$p$ to be A/D (Analog to Digital) converted, respectively.

After that, CP removal parts 186-1 to 186-$p$ remove CP (Cyclic Prefix) added on the transmission side and FFT parts 187-1 to 187-$p$ convert them into frequency domain signals by FFT (Fast Fourier Transform) to output frequency spectrums for each code word.

Figure 19:
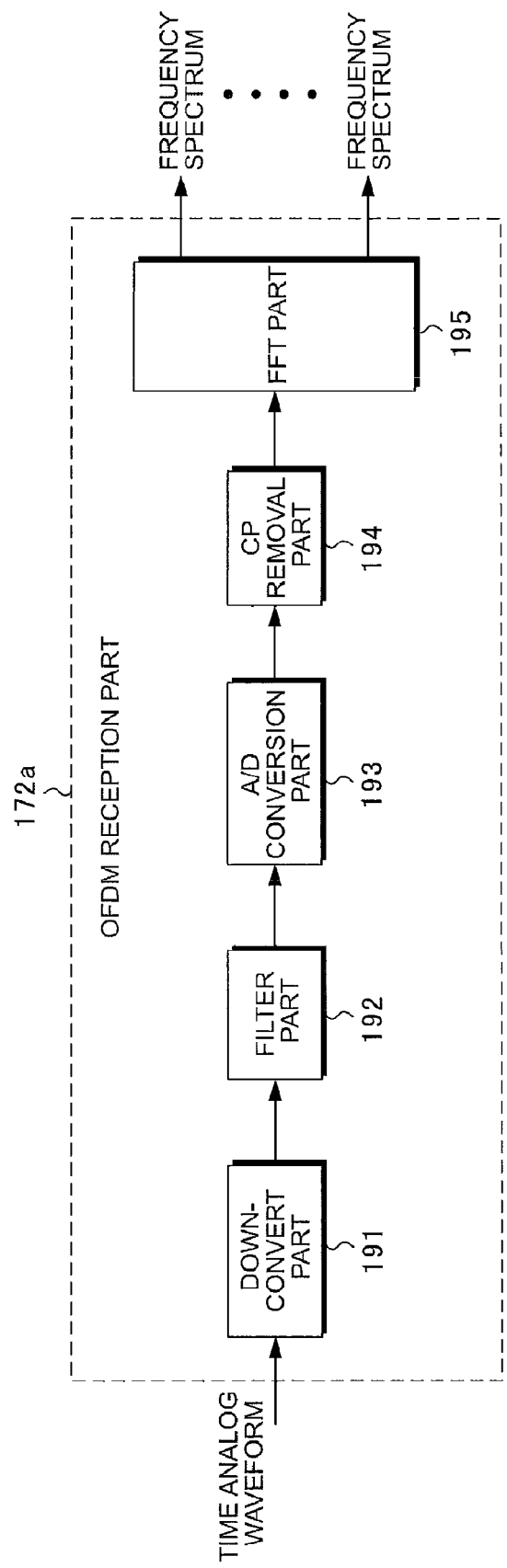
FIG. 19 is a diagram showing another configuration of the OFDM reception part.
Figure 20:
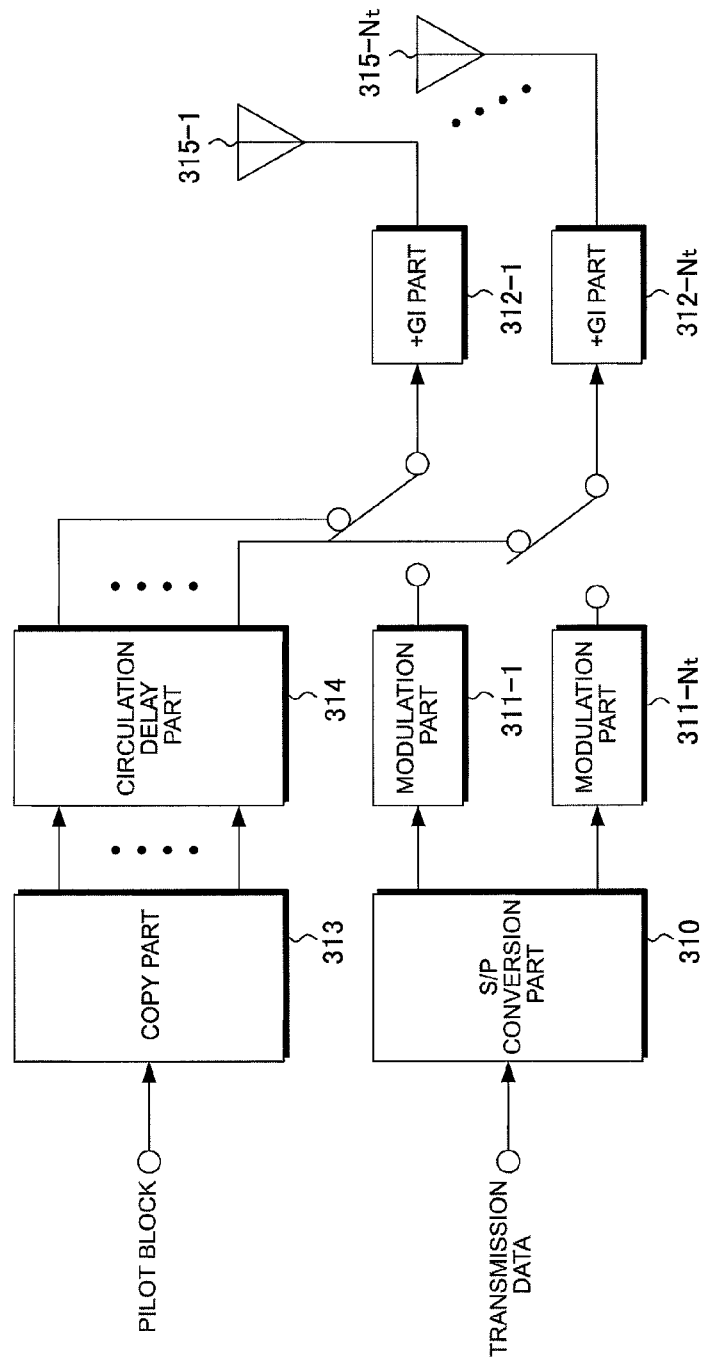
FIG. 20 is a diagram showing configuration of a transmitter disclosed in a non-patent literature 1.
Figure 21:
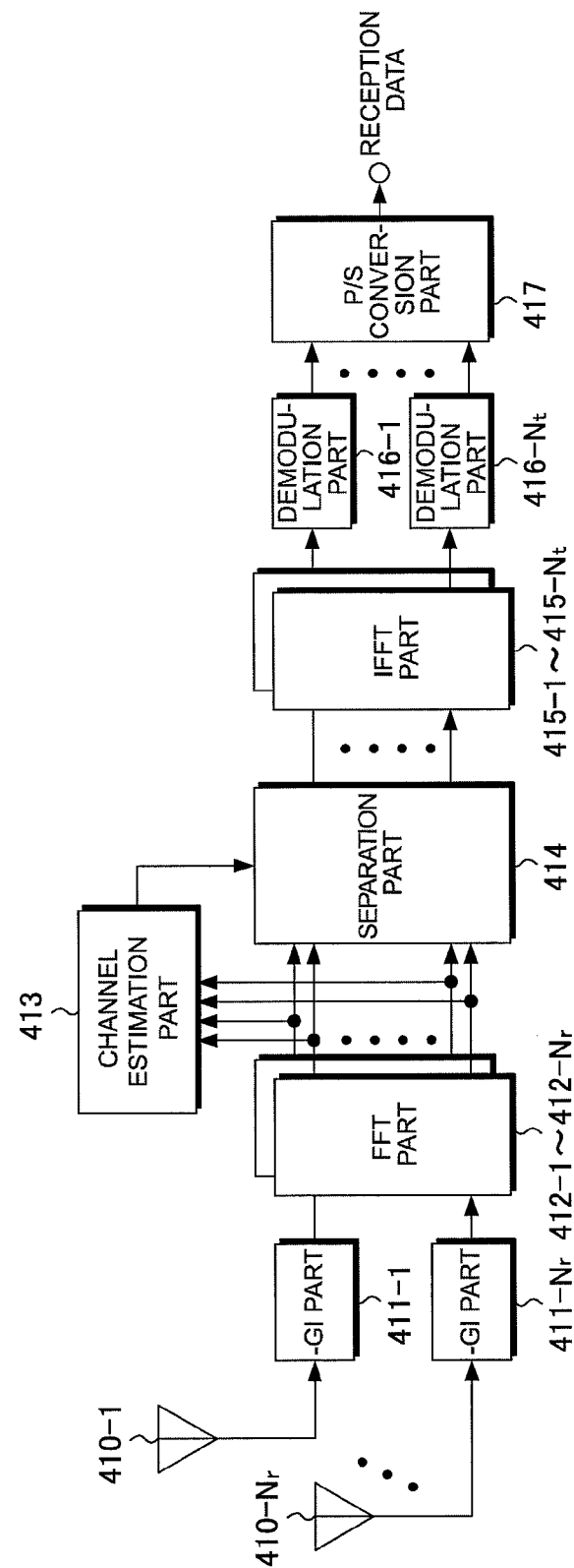
FIG. 21 is a diagram showing configuration of a receiver disclosed in the non-patent literature 1.
Figure 22:
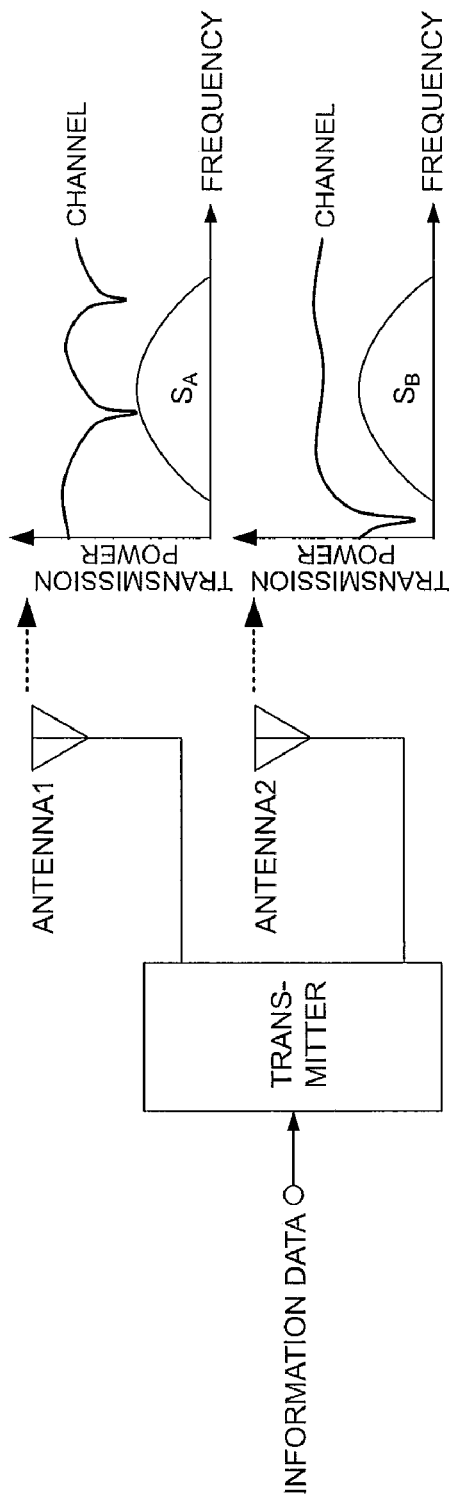
FIG. 22 is a diagram showing relationship between frequency and reception power.

In FIG. 18, assuming that the frequency band used in transmission of each code word greatly varies, the down-convert parts 183-1 to 183-$p$ for the number of code words are provided. However, when the plurality of code words is transmitted using adjacent frequency bands, it is no need to provide a plurality of down-convert parts. For example, as shown in FIG. 19, an OFDM reception part 172$a$ may be configured so that only one down-convert part is provided, a filter part 192 removes unused frequency components, an A/D conversion part 193 performs A/D conversion, a CP removal part 194 removes CP and an FFT part 195 performs conversion into the frequency domain signal. This FFT of the FFT part 195 has the size that is the number of code words times as much as the FFT in FIG. 18.

As described above, when, in single carrier-based transmission, transmission is performed using spectrums that vary for each code word, since the code words correspond to used frequency bands on one-by-one basis, the control signal can be reduced in control of ACK/NAK. Further, the coding rate and the modulation scheme can be changed for each code word, the coding rate and the modulation scheme can be correctly determined based on the channel gain in the used frequency band. As a result, there is an effect that the spectral efficiency can be improved.

The invention claimed is:

1. A transmission apparatus including a plurality of antennas, the transmission apparatus comprising:
   a precoding part for precoding transmission data; and
   a spectrum mapping part provided for each of said transmission antennas; and
   a spectrum division part for dividing a spectrum output from said precoding part into a plurality of partial spectrums and inputting said plurality of partial spectrums to said spectrum mapping part, wherein
   said spectrum division part inputs at least one partial spectrum to a spectrum mapping part different from another spectrum mapping part to which another partial spectrum is input, and
   said spectrum mapping part allocates said at least one partial spectrum to the same frequency as the frequency allocated to said another partial spectrum.

2. The transmission apparatus according to claim 1, further comprising:
   a plurality of coding parts for performing error correction coding on transmission data;
   a plurality of modulation parts for modulating an output of said each coding part;
   a plurality of precoding parts for precoding an output signal of said each modulation part; and
   a plurality of spectrum division parts for dividing a spectrum output from said each precoding part.

3. The transmission apparatus according to claim 1, wherein
   said precoding part performs DFT (Discrete Fourier Transform) to convert a time domain signal into a frequency domain signal.

4. A transmission apparatus comprising a plurality of transmission parts each including a plurality of antennas wherein said each transmission part includes:
   a coding part for performing error correction coding on transmission data;
   a modulation part for modulating an output of said coding part;
   a precoding part for precoding an output signal of said modulation part; and
   a spectrum mapping part provided for each of said transmission antennas; and
   a spectrum division part for dividing a spectrum output from said precoding part into a plurality of partial spectrums and inputting said plurality of partial spectrums to said spectrum mapping part, and wherein
   serial/parallel converted transmission data is input to said each transmission part for each code word, and said each transmission part inputs at least one partial spectrum to a spectrum mapping part different from another spectrum mapping part to which another partial spectrum is input in said spectrum division part and assigns said at least one partial spectrum to the same frequency as the frequency assigned to said another partial spectrum in said spectrum mapping part.

5. A reception apparatus that has a plurality of antennas and receives a signal transmitted from a transmission apparatus according to claim 1 according to a MIMO (Multiple Input Multiple Output) system, the reception apparatus comprising:
   a MIMO separation part for separating spatially multiplexed spectrums; and
   a spectrum combining part for combining said separated spectrums.

6. The reception apparatus according to claim 5, wherein said spectrum combining part combines partial spectrums for each code word.

* * * * *